(12) United States Patent
Kumar et al.

(10) Patent No.: US 11,718,071 B2
(45) Date of Patent: Aug. 8, 2023

(54) VEHICLE INTERIOR SYSTEMS HAVING A CRACK RESISTANT CURVED COVER GLASS AND METHODS FOR FORMING THE SAME

(71) Applicant: CORNING INCORPORATED, Corning, NY (US)

(72) Inventors: Atul Kumar, Horseheads, NY (US); Arpita Mitra, Big Flats, NY (US); Yawei Sun, Elmira, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/979,918

(22) PCT Filed: Mar. 11, 2019

(86) PCT No.: PCT/US2019/021583
§ 371 (c)(1),
(2) Date: Sep. 11, 2020

(87) PCT Pub. No.: WO2019/177952
PCT Pub. Date: Sep. 19, 2019

(65) Prior Publication Data
US 2021/0008846 A1     Jan. 14, 2021

Related U.S. Application Data

(60) Provisional application No. 62/786,690, filed on Dec. 31, 2018, provisional application No. 62/642,211, filed on Mar. 13, 2018.

(51) Int. Cl.
*B32B 17/10* (2006.01)
*C03C 27/04* (2006.01)
(Continued)

(52) U.S. Cl.
CPC ........ *B32B 17/10733* (2013.01); *B32B 17/10* (2013.01); *B32B 17/10036* (2013.01);
(Continued)

(58) Field of Classification Search
CPC ........ B32B 17/10018; B32B 17/10005; B32B 17/10; B32B 17/10128; B32B 17/10137; B32B 17/1055
See application file for complete search history.

(56) References Cited

U.S. PATENT DOCUMENTS 2,068,030 A   1/1937 Lieser
2,608,030 A   8/1952 Jendrisak
(Continued)

FOREIGN PATENT DOCUMENTS

CN   1587132 A   3/2005
CN   1860081 A   11/2006
(Continued)

OTHER PUBLICATIONS

Author Unknown; "Stress Optics Laboratory Practice Guide" 2012; 11 Pages.
(Continued)

*Primary Examiner* — Alicia J Sawdon

(57) ABSTRACT

Embodiments of a vehicle interior system and associated processes are disclosed. In one or more embodiments, the system includes a base with a curved surface, and a curved glass article disposed on the curved surface. The curved glass article includes a high modulus adhesive layer located on the second major surface. The high modulus adhesive layer has a modulus of elasticity of at least 500 MPa. The high modulus adhesive layer provides crack resistance to the glass article. Methods for forming such glass articles and vehicle interior systems are also disclosed.

9 Claims, 7 Drawing Sheets

(51) Int. Cl.
*C03C 17/28* (2006.01)
*B60R 13/02* (2006.01)
*C03C 17/32* (2006.01)
*B60K 35/00* (2006.01)

(52) U.S. Cl.
CPC ........ *B32B 17/10899* (2013.01); *B60R 13/02* (2013.01); *C03C 17/28* (2013.01); *C03C 17/326* (2013.01); *C03C 27/048* (2013.01); *B32B 2605/003* (2013.01); *B60K 35/00* (2013.01); *B60K 2370/60* (2019.05); *C03C 2217/78* (2013.01)

(56) References Cited

U.S. PATENT DOCUMENTS

| | | | |
|---|---|---|---|
| 3,197,903 A | 8/1965 | Walley | |
| 3,338,696 A | 8/1967 | Dockerty | |
| 3,582,456 A | 6/1971 | Stolki | |
| 3,682,609 A | 8/1972 | Dockerty | |
| 3,753,840 A | 8/1973 | Plumat | |
| 3,778,335 A | 12/1973 | Boyd | |
| 3,790,430 A | 2/1974 | Mochel | |
| 3,799,817 A | 3/1974 | Laethem | |
| 3,881,043 A * | 4/1975 | Rieser | B32B 17/10697 52/171.2 |
| 4,052,236 A | 10/1977 | Kapasi | |
| 4,147,527 A | 4/1979 | Bystrov et al. | |
| 4,238,265 A | 12/1980 | Deminet | |
| 4,445,953 A | 5/1984 | Hawk | |
| 4,455,338 A | 6/1984 | Henne | |
| 4,859,636 A | 8/1989 | Aratani et al. | |
| 4,899,507 A | 2/1990 | Mairlot | |
| 4,969,966 A | 11/1990 | Norman | |
| 4,985,099 A | 1/1991 | Mertens et al. | |
| 5,106,671 A * | 4/1992 | Amberger | B32B 17/10018 428/213 |
| 5,108,480 A | 4/1992 | Sugiyama | |
| 5,154,117 A | 10/1992 | Didelot et al. | |
| 5,173,102 A | 12/1992 | Weber et al. | |
| 5,245,468 A | 9/1993 | Demiryont et al. | |
| 5,250,146 A | 10/1993 | Horvath | |
| 5,264,058 A | 11/1993 | Hoagland et al. | |
| 5,300,184 A | 4/1994 | Masunaga | |
| 5,468,346 A * | 11/1995 | Bruce | B32B 17/10018 156/104 |
| 5,711,119 A | 1/1998 | Cornils et al. | |
| 5,897,937 A | 4/1999 | Cornils et al. | |
| 6,044,662 A | 4/2000 | Morin | |
| 6,086,983 A | 7/2000 | Yoshizawa | |
| 6,101,748 A | 8/2000 | Cass et al. | |
| 6,242,931 B1 | 6/2001 | Hembree et al. | |
| 6,265,054 B1 | 7/2001 | Bravet et al. | |
| 6,270,605 B1 | 8/2001 | Doerfler | |
| 6,274,219 B1 | 8/2001 | Schuster et al. | |
| 6,287,674 B1 | 9/2001 | Verlinden et al. | |
| 6,302,985 B1 | 10/2001 | Takahashi et al. | |
| 6,332,690 B1 | 12/2001 | Murofushi | |
| 6,387,515 B1 | 5/2002 | Joret et al. | |
| 6,420,800 B1 | 7/2002 | Levesque et al. | |
| 6,426,138 B1 | 7/2002 | Narushima et al. | |
| 6,582,799 B1 | 6/2003 | Brown et al. | |
| 6,620,365 B1 | 9/2003 | Odoi et al. | |
| 6,816,225 B2 | 11/2004 | Colgan et al. | |
| 6,903,871 B2 | 6/2005 | Page | |
| 7,297,040 B2 | 11/2007 | Chang et al. | |
| 7,375,782 B2 | 5/2008 | Yamazaki et al. | |
| 7,478,930 B2 | 1/2009 | Choi | |
| 7,489,303 B1 | 2/2009 | Pryor | |
| 7,542,302 B1 | 6/2009 | Curnalia et al. | |
| 7,750,821 B1 | 7/2010 | Taborisskiy et al. | |
| 7,955,470 B2 | 6/2011 | Kapp et al. | |
| 8,298,431 B2 | 10/2012 | Chwu et al. | |
| 8,344,369 B2 | 1/2013 | Yamazaki et al. | |
| 8,521,955 B2 | 8/2013 | Arulambalam et al. | |
| 8,549,885 B2 | 10/2013 | Dannoux et al. | |
| 8,586,492 B2 | 11/2013 | Barefoot et al. | |
| 8,652,978 B2 | 2/2014 | Dejneka et al. | |
| 8,692,787 B2 | 4/2014 | Imazeki | |
| 8,702,253 B2 | 4/2014 | Lu et al. | |
| 8,765,262 B2 | 7/2014 | Gross | |
| 8,814,372 B2 | 8/2014 | Vandal et al. | |
| 8,833,106 B2 | 9/2014 | Dannoux et al. | |
| 8,912,447 B2 | 12/2014 | Leong et al. | |
| 8,923,693 B2 | 12/2014 | Yeates | |
| 8,962,084 B2 | 2/2015 | Brackley et al. | |
| 8,967,834 B2 | 3/2015 | Timmerman et al. | |
| 8,969,226 B2 | 3/2015 | Dejneka et al. | |
| 8,978,418 B2 | 3/2015 | Balduin et al. | |
| 9,007,226 B2 | 4/2015 | Chang | |
| 9,061,934 B2 | 6/2015 | Bisson et al. | |
| 9,090,501 B2 | 7/2015 | Okahata et al. | |
| 9,109,881 B2 | 8/2015 | Roussev et al. | |
| 9,140,543 B1 | 9/2015 | Allan et al. | |
| 9,156,724 B2 | 10/2015 | Gross | |
| 9,223,162 B2 | 12/2015 | Deforest et al. | |
| 9,240,437 B2 | 1/2016 | Shieh et al. | |
| 9,278,500 B2 | 3/2016 | Filipp | |
| 9,278,655 B2 | 3/2016 | Jones et al. | |
| 9,290,413 B2 | 3/2016 | Dejneka et al. | |
| 9,346,703 B2 | 5/2016 | Bookbinder et al. | |
| 9,346,706 B2 | 5/2016 | Bazemore et al. | |
| 9,357,638 B2 | 5/2016 | Lee et al. | |
| 9,442,028 B2 | 9/2016 | Roussev et al. | |
| 9,446,723 B2 | 9/2016 | Stepanski | |
| 9,469,561 B2 | 10/2016 | Kladias et al. | |
| 9,517,967 B2 | 12/2016 | Dejneka et al. | |
| 9,573,843 B2 | 2/2017 | Keegan et al. | |
| 9,593,042 B2 | 3/2017 | Hu et al. | |
| 9,595,960 B2 | 3/2017 | Wilford | |
| 9,606,625 B2 | 3/2017 | Levesque et al. | |
| 9,617,180 B2 | 4/2017 | Bookbinder et al. | |
| 9,663,396 B2 | 5/2017 | Miyasaka et al. | |
| 9,694,570 B2 | 7/2017 | Levasseur et al. | |
| 9,700,985 B2 | 7/2017 | Kashima et al. | |
| 9,701,564 B2 | 7/2017 | Bookbinder et al. | |
| 9,720,450 B2 | 8/2017 | Choi et al. | |
| 9,724,727 B2 | 8/2017 | Domey et al. | |
| 9,802,485 B2 | 10/2017 | Masuda et al. | |
| 9,815,730 B2 | 11/2017 | Marjanovic et al. | |
| 9,821,509 B2 | 11/2017 | Kastell | |
| 9,895,975 B2 | 2/2018 | Lee et al. | |
| 9,902,640 B2 | 2/2018 | Dannoux et al. | |
| 9,931,817 B2 | 4/2018 | Rickerl | |
| 9,933,820 B2 | 4/2018 | Helot et al. | |
| 9,947,882 B2 | 4/2018 | Zhang et al. | |
| 9,955,602 B2 | 4/2018 | Wildner et al. | |
| 9,957,190 B2 | 5/2018 | Finkeldey et al. | |
| 9,963,374 B2 | 5/2018 | Jouanno et al. | |
| 9,972,645 B2 | 5/2018 | Kim | |
| 9,975,801 B2 | 5/2018 | Maschmeyer et al. | |
| 9,992,888 B2 | 6/2018 | Moon et al. | |
| 10,005,246 B2 | 6/2018 | Stepanski | |
| 10,017,033 B2 | 7/2018 | Fisher et al. | |
| 10,042,391 B2 | 8/2018 | Yun et al. | |
| 10,074,824 B2 | 9/2018 | Han et al. | |
| 10,086,762 B2 | 10/2018 | Uhm | |
| 10,131,118 B2 | 11/2018 | Kang et al. | |
| 10,140,018 B2 | 11/2018 | Kim et al. | |
| 10,153,337 B2 | 12/2018 | Lee et al. | |
| 10,175,802 B2 | 1/2019 | Boggs et al. | |
| 10,211,416 B2 | 2/2019 | Jin et al. | |
| 10,222,825 B2 | 3/2019 | Wang et al. | |
| 10,273,184 B2 | 4/2019 | Garner et al. | |
| 10,303,223 B2 | 5/2019 | Park et al. | |
| 10,303,315 B2 | 5/2019 | Jeong et al. | |
| 10,326,101 B2 | 6/2019 | Oh et al. | |
| 10,328,865 B2 | 6/2019 | Jung | |
| 10,343,377 B2 | 7/2019 | Levasseur et al. | |
| 10,347,700 B2 | 7/2019 | Yang et al. | |
| 10,377,656 B2 | 8/2019 | Dannoux et al. | |
| 10,421,683 B2 | 9/2019 | Schillinger et al. | |
| 10,427,383 B2 | 10/2019 | Levasseur et al. | |
| 10,444,427 B2 | 10/2019 | Bookbinder et al. | |

(56) References Cited

U.S. PATENT DOCUMENTS

| | | |
|---|---|---|
| 10,483,210 B2 | 11/2019 | Gross et al. |
| 10,500,958 B2 | 12/2019 | Cho et al. |
| 10,606,395 B2 | 3/2020 | Boggs et al. |
| 10,649,267 B2 | 5/2020 | Tuan et al. |
| 10,788,707 B2 | 9/2020 | Ai et al. |
| 10,976,607 B2 | 4/2021 | Huang et al. |
| 2002/0039229 A1 | 4/2002 | Hirose et al. |
| 2004/0026021 A1 | 2/2004 | Groh et al. |
| 2004/0069770 A1 | 4/2004 | Cary et al. |
| 2004/0107731 A1 | 6/2004 | Doehring et al. |
| 2004/0258929 A1 | 12/2004 | Glaubitt et al. |
| 2005/0178158 A1 | 8/2005 | Moulding et al. |
| 2005/0184637 A1 | 8/2005 | Sugawara et al. |
| 2005/0209401 A1 | 9/2005 | Lutz et al. |
| 2006/0227125 A1 | 10/2006 | Wong et al. |
| 2007/0188871 A1 | 8/2007 | Fleury et al. |
| 2007/0195419 A1 | 8/2007 | Tsuda et al. |
| 2007/0210621 A1 | 9/2007 | Barton et al. |
| 2007/0221313 A1 | 9/2007 | Franck et al. |
| 2007/0223121 A1 | 9/2007 | Franck et al. |
| 2007/0291384 A1 | 12/2007 | Wang |
| 2008/0031991 A1 | 2/2008 | Choi et al. |
| 2008/0093753 A1 | 4/2008 | Schuetz |
| 2008/0120946 A1 | 5/2008 | Bayne et al. |
| 2008/0285134 A1 | 11/2008 | Closset et al. |
| 2008/0303976 A1 | 12/2008 | Nishizawa et al. |
| 2009/0091681 A1 | 4/2009 | Nishizawa et al. |
| 2009/0096937 A1 | 4/2009 | Bauer et al. |
| 2009/0096965 A1* | 4/2009 | Nagata ............... G02F 1/133305 |
| | | 313/504 |
| 2009/0101208 A1 | 4/2009 | Vandal et al. |
| 2009/0117332 A1 | 5/2009 | Ellsworth et al. |
| 2009/0179840 A1 | 7/2009 | Tanaka et al. |
| 2009/0185127 A1 | 7/2009 | Tanaka et al. |
| 2009/0201443 A1 | 8/2009 | Sasaki et al. |
| 2009/0311497 A1 | 12/2009 | Aoki |
| 2010/0000259 A1 | 1/2010 | Ukrainczyk et al. |
| 2010/0031590 A1 | 2/2010 | Buchwald et al. |
| 2010/0065342 A1 | 3/2010 | Shaikh |
| 2010/0103138 A1 | 4/2010 | Huang et al. |
| 2010/0182143 A1 | 7/2010 | Lynam |
| 2010/0245253 A1 | 9/2010 | Rhyu et al. |
| 2011/0057465 A1 | 3/2011 | Beau et al. |
| 2011/0148267 A1 | 6/2011 | McDaniel et al. |
| 2012/0050975 A1 | 3/2012 | Garelli et al. |
| 2012/0111056 A1 | 5/2012 | Prest |
| 2012/0128952 A1 | 5/2012 | Miwa et al. |
| 2012/0134025 A1 | 5/2012 | Hart |
| 2012/0144866 A1 | 6/2012 | Liu et al. |
| 2012/0152897 A1 | 6/2012 | Cheng et al. |
| 2012/0196110 A1 | 8/2012 | Murata et al. |
| 2012/0202030 A1 | 8/2012 | Kondo et al. |
| 2012/0218640 A1 | 8/2012 | Gollier et al. |
| 2012/0263945 A1 | 10/2012 | Yoshikawa |
| 2012/0280368 A1 | 11/2012 | Garner et al. |
| 2012/0320509 A1 | 12/2012 | Kim et al. |
| 2013/0020007 A1 | 1/2013 | Niiyama et al. |
| 2013/0033885 A1 | 2/2013 | Oh et al. |
| 2013/0070340 A1 | 3/2013 | Shelestak et al. |
| 2013/0081428 A1 | 4/2013 | Liu et al. |
| 2013/0088441 A1 | 4/2013 | Chung et al. |
| 2013/0108855 A1* | 5/2013 | Marchelli ............... A01G 9/022 |
| | | 428/221 |
| 2013/0120850 A1 | 5/2013 | Lambert et al. |
| 2013/0186141 A1 | 7/2013 | Henry |
| 2013/0209824 A1 | 8/2013 | Sun et al. |
| 2013/0279188 A1 | 10/2013 | Entenmann et al. |
| 2013/0314642 A1 | 11/2013 | Timmerman et al. |
| 2013/0329346 A1 | 12/2013 | Dannoux et al. |
| 2013/0330495 A1 | 12/2013 | Maatta et al. |
| 2014/0014260 A1 | 1/2014 | Chowdhury et al. |
| 2014/0036428 A1 | 2/2014 | Seng et al. |
| 2014/0065374 A1 | 3/2014 | Tsuchiya et al. |
| 2014/0141206 A1 | 5/2014 | Gillard et al. |
| 2014/0146538 A1 | 5/2014 | Zenker et al. |
| 2014/0153234 A1 | 6/2014 | Knoche et al. |
| 2014/0153894 A1 | 6/2014 | Jenkins et al. |
| 2014/0168153 A1 | 6/2014 | Deichmann et al. |
| 2014/0168546 A1 | 6/2014 | Magnusson et al. |
| 2014/0226111 A1 | 8/2014 | Kim |
| 2014/0234581 A1 | 8/2014 | Immerman et al. |
| 2014/0308464 A1 | 10/2014 | Levasseur et al. |
| 2014/0312518 A1 | 10/2014 | Levasseur et al. |
| 2014/0333848 A1 | 11/2014 | Chen |
| 2014/0340609 A1 | 11/2014 | Taylor et al. |
| 2014/0355805 A1 | 12/2014 | Park et al. |
| 2015/0015807 A1 | 1/2015 | Franke et al. |
| 2015/0072125 A1* | 3/2015 | Murashige ............... B32B 37/12 |
| | | 428/216 |
| 2015/0072129 A1 | 3/2015 | Okahata et al. |
| 2015/0077429 A1 | 3/2015 | Eguchi et al. |
| 2015/0166394 A1 | 6/2015 | Marjanovic et al. |
| 2015/0168768 A1 | 6/2015 | Nagatani |
| 2015/0177443 A1 | 6/2015 | Faecke et al. |
| 2015/0210588 A1 | 7/2015 | Chang et al. |
| 2015/0246424 A1 | 9/2015 | Venkatachalam et al. |
| 2015/0246507 A1 | 9/2015 | Brown et al. |
| 2015/0274585 A1 | 10/2015 | Rogers et al. |
| 2015/0277131 A1 | 10/2015 | Park et al. |
| 2015/0322270 A1 | 11/2015 | Amin et al. |
| 2015/0336357 A1 | 11/2015 | Kang et al. |
| 2015/0351272 A1 | 12/2015 | Wildner et al. |
| 2015/0357387 A1 | 12/2015 | Lee et al. |
| 2016/0009066 A1 | 1/2016 | Nieber et al. |
| 2016/0009068 A1 | 1/2016 | Garner |
| 2016/0016849 A1 | 1/2016 | Allan |
| 2016/0039705 A1 | 2/2016 | Kato et al. |
| 2016/0052241 A1 | 2/2016 | Zhang |
| 2016/0066463 A1 | 3/2016 | Yang et al. |
| 2016/0081204 A1 | 3/2016 | Park et al. |
| 2016/0083282 A1 | 3/2016 | Jouanno et al. |
| 2016/0083292 A1 | 3/2016 | Tabe et al. |
| 2016/0091645 A1 | 3/2016 | Birman et al. |
| 2016/0102015 A1 | 4/2016 | Yasuda et al. |
| 2016/0113135 A1 | 4/2016 | Kim et al. |
| 2016/0152819 A1 | 6/2016 | Balijepalli et al. |
| 2016/0207290 A1 | 7/2016 | Cleary et al. |
| 2016/0214889 A1 | 7/2016 | Garner et al. |
| 2016/0216434 A1 | 7/2016 | Shih et al. |
| 2016/0250982 A1 | 9/2016 | Fisher et al. |
| 2016/0252656 A1 | 9/2016 | Waldschmidt et al. |
| 2016/0259365 A1 | 9/2016 | Wang et al. |
| 2016/0272529 A1 | 9/2016 | Hong et al. |
| 2016/0297176 A1 | 10/2016 | Rickerl |
| 2016/0306451 A1 | 10/2016 | Isoda et al. |
| 2016/0313494 A1 | 10/2016 | Hamilton et al. |
| 2016/0354996 A1 | 12/2016 | Alder et al. |
| 2016/0355091 A1 | 12/2016 | Lee et al. |
| 2016/0355901 A1 | 12/2016 | Isozaki et al. |
| 2016/0375808 A1 | 12/2016 | Etienne et al. |
| 2017/0008377 A1 | 1/2017 | Fisher et al. |
| 2017/0021661 A1 | 1/2017 | Pelucchi |
| 2017/0066223 A1 | 3/2017 | Notsu et al. |
| 2017/0081238 A1 | 3/2017 | Jones et al. |
| 2017/0088454 A1 | 3/2017 | Fukushima et al. |
| 2017/0094039 A1 | 3/2017 | Lu |
| 2017/0115944 A1 | 4/2017 | Oh et al. |
| 2017/0158551 A1 | 6/2017 | Bookbinder et al. |
| 2017/0160434 A1 | 6/2017 | Hart et al. |
| 2017/0185289 A1 | 6/2017 | Kim et al. |
| 2017/0190152 A1 | 7/2017 | Notsu et al. |
| 2017/0197561 A1 | 7/2017 | McFarland |
| 2017/0213872 A1 | 7/2017 | Jinbo et al. |
| 2017/0217290 A1 | 8/2017 | Yoshizumi et al. |
| 2017/0217815 A1 | 8/2017 | Dannoux et al. |
| 2017/0240772 A1 | 8/2017 | Dohner et al. |
| 2017/0247291 A1 | 8/2017 | Hatano et al. |
| 2017/0262057 A1 | 9/2017 | Knittl et al. |
| 2017/0263690 A1 | 9/2017 | Lee et al. |
| 2017/0274627 A1 | 9/2017 | Chang et al. |
| 2017/0285227 A1 | 10/2017 | Chen et al. |
| 2017/0305786 A1 | 10/2017 | Roussev et al. |
| 2017/0327402 A1 | 11/2017 | Fujii et al. |
| 2017/0334770 A1 | 11/2017 | Luzzato et al. |

(56) References Cited

U.S. PATENT DOCUMENTS

| | | |
|---|---|---|
| 2017/0349473 A1 | 12/2017 | Moriya et al. |
| 2018/0009197 A1 | 1/2018 | Gross et al. |
| 2018/0014420 A1 | 1/2018 | Amin et al. |
| 2018/0031743 A1 | 2/2018 | Wakatsuki et al. |
| 2018/0050948 A1 | 2/2018 | Faik et al. |
| 2018/0052254 A1 | 2/2018 | Takai et al. |
| 2018/0065881 A1 | 3/2018 | Hashimoto et al. |
| 2018/0069053 A1 | 3/2018 | Bok |
| 2018/0072022 A1 | 3/2018 | Tsai et al. |
| 2018/0088399 A1 | 3/2018 | Fukushi et al. |
| 2018/0103132 A1 | 4/2018 | Prushinskiy et al. |
| 2018/0111569 A1 | 4/2018 | Faik et al. |
| 2018/0122863 A1 | 5/2018 | Bok |
| 2018/0125228 A1 | 5/2018 | Porter et al. |
| 2018/0134232 A1 | 5/2018 | Helot |
| 2018/0141850 A1 | 5/2018 | Dejneka et al. |
| 2018/0147985 A1 | 5/2018 | Brown et al. |
| 2018/0149777 A1 | 5/2018 | Brown |
| 2018/0149907 A1 | 5/2018 | Gahagan et al. |
| 2018/0164850 A1 | 6/2018 | Sim et al. |
| 2018/0186674 A1 | 7/2018 | Kumar et al. |
| 2018/0188869 A1 | 7/2018 | Boggs et al. |
| 2018/0208131 A1 | 7/2018 | Mattelet et al. |
| 2018/0208494 A1 | 7/2018 | Mattelet et al. |
| 2018/0210118 A1 | 7/2018 | Gollier et al. |
| 2018/0215125 A1 | 8/2018 | Gahagan |
| 2018/0245125 A1 | 8/2018 | Tsai et al. |
| 2018/0273422 A1 | 9/2018 | Hori et al. |
| 2018/0304825 A1 | 10/2018 | Mattelet et al. |
| 2018/0324964 A1 | 11/2018 | Yoo et al. |
| 2018/0345644 A1 | 12/2018 | Kang et al. |
| 2018/0364760 A1 | 12/2018 | Ahn et al. |
| 2018/0374906 A1 | 12/2018 | Everaerts et al. |
| 2019/0034017 A1 | 1/2019 | Boggs et al. |
| 2019/0039352 A1 | 2/2019 | Zhao et al. |
| 2019/0039935 A1 | 2/2019 | Couillard et al. |
| 2019/0069451 A1 | 2/2019 | Myers et al. |
| 2019/0077337 A1 | 3/2019 | Gervelmeyer |
| 2019/0152831 A1 | 5/2019 | An et al. |
| 2019/0223309 A1 | 7/2019 | Amin et al. |
| 2019/0295494 A1 | 9/2019 | Wang et al. |
| 2019/0315648 A1 | 10/2019 | Kumar et al. |
| 2019/0329531 A1 | 10/2019 | Brennan et al. |
| 2020/0064535 A1 | 2/2020 | Haan et al. |
| 2020/0301192 A1 | 9/2020 | Huang et al. |
| 2021/0055599 A1 | 2/2021 | Chen et al. |

FOREIGN PATENT DOCUMENTS

| | | |
|---|---|---|
| CN | 101600846 A | 12/2009 |
| CN | 101684032 A | 3/2010 |
| CN | 201989544 U | 9/2011 |
| CN | 102341356 A | 2/2012 |
| CN | 102464456 A | 5/2012 |
| CN | 102566841 A | 7/2012 |
| CN | 103136490 A | 6/2013 |
| CN | 103587161 A | 2/2014 |
| CN | 203825589 U | 9/2014 |
| CN | 104220253 A | 12/2014 |
| CN | 204111583 U | 1/2015 |
| CN | 104656999 A | 5/2015 |
| CN | 104679341 A | 6/2015 |
| CN | 204463066 U | 7/2015 |
| CN | 104843976 A | 8/2015 |
| CN | 105118391 A | 12/2015 |
| CN | 105511127 A | 4/2016 |
| CN | 205239166 U | 5/2016 |
| CN | 105705330 A | 6/2016 |
| CN | 106256794 A | 12/2016 |
| CN | 205905907 U | 1/2017 |
| CN | 106458683 A | 2/2017 |
| CN | 206114596 U | 4/2017 |
| CN | 206114956 U | 4/2017 |
| CN | 107613809 A | 1/2018 |
| CN | 107757516 A | 3/2018 |
| CN | 108519831 A | 9/2018 |
| CN | 108550587 A | 9/2018 |
| CN | 108725350 A | 11/2018 |
| CN | 109135605 A | 1/2019 |
| CN | 109690662 A | 4/2019 |
| CN | 109743421 A | 5/2019 |
| DE | 4415787 A1 | 11/1995 |
| DE | 4415878 A1 | 11/1995 |
| DE | 69703490 T2 | 5/2001 |
| DE | 102004022008 A1 | 12/2004 |
| DE | 102004002208 A1 | 8/2005 |
| DE | 102009021938 A1 | 11/2010 |
| DE | 102010007204 A1 | 8/2011 |
| DE | 102013214108 A1 | 2/2015 |
| DE | 102014116798 A1 | 5/2016 |
| DE | 112015003842 T5 | 5/2017 |
| EP | 0076924 A2 | 4/1983 |
| EP | 0316224 A1 | 5/1989 |
| EP | 0347049 A2 | 12/1989 |
| EP | 0418700 A1 | 3/1991 |
| EP | 0423698 A1 | 4/1991 |
| EP | 0525970 A1 | 2/1993 |
| EP | 0664210 A1 | 7/1995 |
| EP | 1013622 A1 | 6/2000 |
| EP | 1031409 A1 | 8/2000 |
| EP | 1046493 A2 | 10/2000 |
| EP | 0910721 B1 | 11/2000 |
| EP | 1560251 A1 | 8/2005 |
| EP | 1574537 A1 | 9/2005 |
| EP | 1647663 A1 | 4/2006 |
| EP | 2236281 A1 | 10/2010 |
| EP | 2385630 A2 | 11/2011 |
| EP | 2521118 A2 | 11/2012 |
| EP | 2852502 A2 | 4/2015 |
| EP | 2933718 A1 | 10/2015 |
| EP | 3093181 A2 | 11/2016 |
| EP | 3100854 A1 | 12/2016 |
| EP | 3118174 A1 | 1/2017 |
| EP | 3118175 A1 | 1/2017 |
| EP | 3144141 A1 | 3/2017 |
| EP | 3156286 A1 | 4/2017 |
| EP | 3189965 A1 | 7/2017 |
| EP | 3144283 A4 | 2/2018 |
| EP | 3288791 A1 | 3/2018 |
| EP | 3426614 A1 | 1/2019 |
| EP | 3532442 A1 | 9/2019 |
| FR | 2750075 A1 | 12/1997 |
| FR | 2918411 A1 | 1/2009 |
| FR | 3012073 A1 | 4/2015 |
| GB | 0805770 A | 12/1958 |
| GB | 0991867 A | 5/1965 |
| GB | 1319846 A | 6/1973 |
| GB | 2011316 A | 7/1979 |
| GB | 2281542 A | 3/1995 |
| JP | 55-154329 | 12/1980 |
| JP | 57-048082 A | 3/1982 |
| JP | 58-073681 A | 5/1983 |
| JP | 58-194751 | 11/1983 |
| JP | 59-076561 | 5/1984 |
| JP | 63-089317 A | 4/1988 |
| JP | 63-190730 | 8/1988 |
| JP | 03-059337 U | 6/1991 |
| JP | 03-228840 A | 10/1991 |
| JP | 04-119931 | 4/1992 |
| JP | 05-116972 A | 5/1993 |
| JP | 06-340029 A | 12/1994 |
| JP | 10-218630 A | 8/1998 |
| JP | 11-001349 A | 1/1999 |
| JP | 11-006029 A | 1/1999 |
| JP | 11-060293 A | 3/1999 |
| JP | 3059337 B2 | 7/2000 |
| JP | 2000-260330 A | 9/2000 |
| JP | 2002-255574 A | 9/2002 |
| JP | 2003-500260 A | 1/2003 |
| JP | 2003-276571 A | 10/2003 |
| JP | 2003-321257 A | 11/2003 |
| JP | 2004-101712 A | 4/2004 |
| JP | 2004-284839 A | 10/2004 |
| JP | 2006-181936 A | 7/2006 |

(56) References Cited

FOREIGN PATENT DOCUMENTS

| | | |
|---|---|---|
| JP | 2006-323158 A | 11/2006 |
| JP | 2007-188035 A | 7/2007 |
| JP | 2007-197288 A | 8/2007 |
| JP | 2010-145731 A | 7/2010 |
| JP | 2012-111661 A | 6/2012 |
| JP | 2013-084269 A | 5/2013 |
| JP | 2013-212633 A | 10/2013 |
| JP | 2014-126564 A | 7/2014 |
| JP | 2015-502901 A | 1/2015 |
| JP | 2015-092422 A | 5/2015 |
| JP | 5748082 B2 | 7/2015 |
| JP | 5796561 B2 | 10/2015 |
| JP | 2016-500458 A | 1/2016 |
| JP | 2016-031696 A | 3/2016 |
| JP | 2016-109936 A | 6/2016 |
| JP | 2016-517380 A | 6/2016 |
| JP | 2016-130810 A | 7/2016 |
| JP | 2016-144008 A | 8/2016 |
| JP | 5976561 B2 | 8/2016 |
| JP | 2016-173794 A | 9/2016 |
| JP | 2016-530204 A | 9/2016 |
| JP | 2016-203609 A | 12/2016 |
| JP | 2016-207200 A | 12/2016 |
| JP | 2017-532220 A | 11/2017 |
| JP | 6281825 B2 | 2/2018 |
| JP | 6340029 B2 | 6/2018 |
| JP | 2018-528116 A | 9/2018 |
| JP | 2018-528912 A | 10/2018 |
| JP | 2018-529611 A | 10/2018 |
| JP | 2019-501052 A | 1/2019 |
| KR | 2002-0019045 A | 3/2002 |
| KR | 10-0479282 B1 | 8/2005 |
| KR | 10-2008-0023888 A | 3/2008 |
| KR | 10-2013-0005776 A | 1/2013 |
| KR | 10-2014-0111403 A | 9/2014 |
| KR | 10-2015-0026911 A | 3/2015 |
| KR | 10-2015-0033969 A | 4/2015 |
| KR | 10-2015-0051458 A | 5/2015 |
| KR | 10-1550833 B1 | 9/2015 |
| KR | 10-2015-0121101 A | 10/2015 |
| KR | 10-2016-0118746 A | 10/2016 |
| KR | 10-1674060 B1 | 11/2016 |
| KR | 10-2016-0144008 A | 12/2016 |
| KR | 10-2017-0000208 A | 1/2017 |
| KR | 10-2017-0106263 A | 9/2017 |
| KR | 10-2017-0107124 A | 9/2017 |
| KR | 10-2017-0113822 A | 10/2017 |
| KR | 10-2017-0121674 A | 11/2017 |
| KR | 10-2018-0028597 A | 3/2018 |
| KR | 10-2018-0049484 A | 5/2018 |
| KR | 10-2018-0049780 A | 5/2018 |
| KR | 10-2019-0001864 A | 1/2019 |
| KR | 10-2019-0081264 A | 7/2019 |
| TW | 200704268 A | 1/2007 |
| TW | 200821221 A | 5/2008 |
| TW | 201438895 A | 10/2014 |
| TW | 201546006 A | 12/2015 |
| TW | 201636309 A | 10/2016 |
| TW | 201637857 A | 11/2016 |
| VN | 58334 | 7/2018 |
| WO | 94/25272 A1 | 11/1994 |
| WO | 97/39074 A1 | 10/1997 |
| WO | 98/01649 A1 | 1/1998 |
| WO | 00/73062 A1 | 12/2000 |
| WO | 2006/095005 A1 | 9/2006 |
| WO | 2007/108861 A1 | 9/2007 |
| WO | 2008/042731 A1 | 4/2008 |
| WO | 2008/153484 A1 | 12/2008 |
| WO | 2009/072530 A1 | 6/2009 |
| WO | 2011/029852 A1 | 3/2011 |
| WO | 2011/144359 A1 | 11/2011 |
| WO | 2011/155403 A1 | 12/2011 |
| WO | 2012/005307 A1 | 1/2012 |
| WO | 2012/058084 A2 | 5/2012 |
| WO | 2012/166343 A2 | 12/2012 |
| WO | 2013/072611 A1 | 5/2013 |
| WO | 2013/072612 A1 | 5/2013 |
| WO | 2013/174715 A1 | 11/2013 |
| WO | 2013/175106 A2 | 11/2013 |
| WO | 2013/176150 A1 | 11/2013 |
| WO | 2014/085663 A1 | 6/2014 |
| WO | 2014/107640 A1 | 7/2014 |
| WO | 2014/172237 A2 | 10/2014 |
| WO | 2014/175371 A1 | 10/2014 |
| WO | 2015/031594 A2 | 3/2015 |
| WO | 2015/055583 A1 | 4/2015 |
| WO | 2015/057552 A2 | 4/2015 |
| WO | 2015/084902 A1 | 6/2015 |
| WO | 2015/085283 A1 | 6/2015 |
| WO | 2015/141966 A1 | 9/2015 |
| WO | 2016/007815 A1 | 1/2016 |
| WO | 2016/007843 A1 | 1/2016 |
| WO | 2016/010947 A1 | 1/2016 |
| WO | 2016/010949 A1 | 1/2016 |
| WO | WO-2016028542 A1 * | 2/2016 ............ B32B 7/12 |
| WO | 2016/044360 A1 | 3/2016 |
| WO | 2016/069113 A1 | 5/2016 |
| WO | 2016/070974 A1 | 5/2016 |
| WO | 2016/115311 A1 | 7/2016 |
| WO | 2016/125713 A1 | 8/2016 |
| WO | 2016/136758 A1 | 9/2016 |
| WO | 2016/173699 A1 | 11/2016 |
| WO | 2016/183059 A1 | 11/2016 |
| WO | 2016/194916 A1 | 12/2016 |
| WO | 2016/195301 A1 | 12/2016 |
| WO | 2016/196531 A1 | 12/2016 |
| WO | 2016/196546 A1 | 12/2016 |
| WO | 2016/202605 A1 | 12/2016 |
| WO | 2017/015392 A1 | 1/2017 |
| WO | 2017/019851 A1 | 2/2017 |
| WO | 2017/023673 A1 | 2/2017 |
| WO | 2017/086316 A1 | 5/2017 |
| WO | 2017/094727 A1 | 6/2017 |
| WO | 2017/100646 A1 | 6/2017 |
| WO | 2017/106081 A1 | 6/2017 |
| WO | 2017/146866 A1 | 8/2017 |
| WO | 2017/155932 A1 | 9/2017 |
| WO | 2017/158031 A1 | 9/2017 |
| WO | 2017/208995 A1 | 12/2017 |
| WO | 2018/005646 A1 | 1/2018 |
| WO | 2018/009504 A1 | 1/2018 |
| WO | 2018/015392 A1 | 1/2018 |
| WO | 2018/075853 A1 | 4/2018 |
| WO | 2018/081068 A1 | 5/2018 |
| WO | 2018/102332 A1 | 6/2018 |
| WO | 2018/125683 A1 | 7/2018 |
| WO | 2018/160812 A2 | 9/2018 |
| WO | 2018/200454 A1 | 11/2018 |
| WO | 2018/200807 A1 | 11/2018 |
| WO | 2018/213267 A1 | 11/2018 |
| WO | 2019/055469 A1 | 3/2019 |
| WO | 2019/055652 A1 | 3/2019 |
| WO | 2019/074800 A1 | 4/2019 |
| WO | 2019/075065 A1 | 4/2019 |
| WO | 2019/151618 A1 | 8/2019 |

OTHER PUBLICATIONS

Belis et al; "Cold Bending of Laminated Glass Panels"; Heron vol. 52 (2007) No. 1/2; 24 Pages.
Doyle et al; "Manual On Experimental Stress Analysis"; Fifth Edition, Society for Experimental Mechanics; Unknown Year; 31 Pages.
Elziere; "Laminated Glass: Dynamic Rupture of Adhesion"; Polymers; Universite Pierre et Marie Curie—Paris VI, 2016. English; 181 Pages.
Fildhuth et al; "Considerations Using Curved, Heat or Cold Bent Glass for Assembling Full Glass Shells", Engineered Transparency, International Conference at Glasstec, Dusseldorf, Germany, Oct. 25 and 26, 2012; 11 Pages.
Fildhuth et al; "Interior Stress Monitoring of Laminated Cold Bent Glass With Fibre Bragg Sensors", Challenging Glass 4 & Cost

(56) References Cited

OTHER PUBLICATIONS

Action TU0905 Final Conference Louter, Bos & Belis (Eds), 2014; 8 Pages.
Fildhuth et al; "Layout Strategies and Optimisation of Joint Patterns in Full Glass Shells", Challenging Glass 3—Conference on Architectural and Structural Applications of Glass, Bos, Louter, Nijsse, Veer (Eds.), Tu Delft, Jun. 2012; 13 Pages.
Fildhuth et al; "Recovery Behaviour of Laminated Cold Bent Glass—Numerical Analysis and Testing"; Challenging Glass 4 & Cost Action TU0905 Final Conference—Louter, Bos & Beus (Eds) (2014); 9 Pages.
Fildhuth; "Design and Monitoring of Cold Bent Lamination—Stabilised Glass"; ITKE 39 (2015) 270 Pages.
Galuppi et al; "Cold-Lamination-Bending of Glass: Sinusoidal is Better Than Circular", Composites Part B 79 (2015) 285-300.
Galuppi et al; "Optical Cold Bending of Laminated Glass"; Internaitonal Journal of Solids and Structures, 67-68 (2015) pp. 231-243.
Millard; "Bending Glass in the Parametric Age"; Enclos; (2015); pp. 1-6; http://www.enclos.com/site-info/news/bending-glass-in-the-parametric-age.
Neugebauer et al; "Let Thin Glass in the FAADE Move Thin Glass—New Possibilities for Glass in the FAADE", Conference Paper Jun. 2018; 12 Pages.
Vakar et al; "Cold Bendable, Laminated Glass—New Possibilities in Design"; Structural Engineering International, Feb. 2004 pp. 95-97.
Weijde; "Graduation Plan"; Jan. 2017; 30 Pages.
Werner; "Display Materials and Processes," Information Display; May 2015; 8 Pages.
International Search Report and Written Opinion of the International Searching Authority; PCT/US2019/021583; dated Jun. 21, 2019; 10 Pages; European Patent Office.
"Stainless Steel—Grade 410 (UNS S41000)", available online at <https://www.azom.com/article.aspx?ArticleID=970>, Oct. 23, 2001, 5 pages.
"Standard Test Method for Measurement of Glass Stress—Optical Coefficient", ASTM International, Designation: C770-16, 2016.
Ashley Klamer, "Dead front overlays", Marking Systems, Inc., Jul. 8, 2013, 2 pages.
ASTM C1422/C1422M-10 "Standard Specification for Chemically Strengthened Flat Glass"; Downloaded Jan. 24, 2018; 5 pages.
ASTM Standard C770-98 (2013), "Standard Test Method for Measurement of Glass Stress-Optical Coefficient".
Burchardt et al., (Editorial Team), Elastic Bonding: The basic principles of adhesive technology and a guide to its cost-effective use in industry, 2006, 71 pages.
Byun et al; "A Novel Route for Thinning of LCD Glass Substrates"; SID 06 DIGEST; pp. 1786-1788, v37, 2006.
Datsiou et al., "Behaviour of cold bent glass plates during the shaping process", Engineered Transparency. International Conference atglasstec, Dusseldorf, Germany, Oct. 21 and 22, 2014, 9 pages.
Engineering ToolBox, "Coefficients of Linear Thermal Expansion", available online at <https://www.engineeringtoolbox.com/linear-expansion-coefficients-d_95.html>, 2003, 9 pages.
Fauercia "Intuitive HMI for a Smart Life on Board" (2018); 8 Pages http://www.faurecia.com/en/innovation/smart-life-board/intuitive-HMI.
Faurecia: Smart Pebbles, Nov. 10, 2016 (Nov. 10, 2016), XP055422209, Retrieved from the Internet: URL:https://web.archive.org/web/20171123002248/http://www.faurecia.com/en/innovation/discover-our-innovations/smart-pebbles [retrieved on Nov. 23, 2017].
Ferwerda et al., "Perception of sparkle in anti-glare display screens", Journal of the SID, vol. 22, Issue 2, 2014, pp. 129-136.
Galuppi et al; "Buckling Phenomena in Double Curved Cold-Bent Glass;" Intl. J. Non-Linear Mechanics 64 (2014) pp. 70-84.
Galuppi et al; "Large Deformations and Snap-Through Instability of Cold-Bent Glass"; Challenging Glass 4 & Cost Action TU0905 Final Conference; (2014) pp. 681-689.
Galuppi L et al: "Optimal cold bending of laminated glass", 20070101 vol. 52, No. 1/2 Jan. 1, 2007 (Jan. 1, 2007), pp. 123-146.
Gollier et al., "Display Sparkle Measurement and Human Response", SID Symposium Digest of Technical Papers, vol. 44, Issue 1, 2013, pp. 295-297.
Indian Patent Application No. 201917031293 Office Action dated May 24, 2021; 6 pages; Indian Patent Office.
Jalopnik, "This Touch Screen Car Interior is a Realistic Vision of the Near Future", jalopnik.com, Nov. 19, 2014, https://jalopnik.com/this-touch-screen-car-interior-is-a-realistic-vision-of-1660846024 (Year: 2014).
Li et al., "Effective Surface Treatment on the Cover Glass for Autointerior Applications", SID Symposium Digest of Technical Papers, vol. 47, 2016, pp. 467-469.
Pambianchi et al; "Corning Incorporated: Designing a New Future With Glass and Optics"; Chapter 1 In "Materials Research for Manufacturing: An Industrial Perspective of Turning Materials Into New Products"; Springer Series Material Science 224, p. 12 (2016).
Pegatron Corp. "Pegaton Navigate the Future"; Ecockpit/Center Cnsole Work Premiere; Automotive World; Downloaded Jul. 12, 2017; 2 Pages.
Photodon, "Screen Protectors For Your Car's Navi System That You're Gonna Love", photodon.com, Nov. 6, 2015, https://www.photodon.com/blog/archives/screen-protectors-for-your-cars-navi-system-that-youre-gonna-love) (Year: 2015).
Product Information Sheet: Coming® Gorilla® Glass 3 with Native Damage Resistance™, Coming Incorporated, 2015, Rev: F_090315, 2 pages.
Scholze, H., "Glass-Water Interactions", Journal of Non-Crystalline Solids vol. 102, Issues 1-3, Jun. 1, 1988, pp. 1-10.
Stattler; "New Wave—Curved Glass Shapes Design"; Glass Magazine; (2013); 2 Pages.
Stiles Custom Metal, Inc., Installation Recommendations, 2010 https://stilesdoors.com/techdata/pdf/Installation%20Recommendations%20HM%20Windows,%20Transoms%20&%>OSidelites%200710.pdf) (Year: 2010).
Tomozawa et al., "Hydrogen-to-Alkali Ratio in Hydrated Alkali Aluminosilicate Glass Surfaces", Journal of Non-Crystalline Solids, vol. 358, Issue 24, Dec. 15, 2012, pp. 3546-3550.
Zhixin Wang, Polydimethylsiloxane mechanical properties measured by macroscopic compression and nanoindentation techniques, Graduate Theses and Dissertations, University of South Florida, 2011, 79 pages.
Chinese Patent Application No. 201980022211.6, Office Action, dated Jun. 1, 2022, 5 pages, Chinese Patent Office.
Taiwanese Patent Application No. 108108175, Office Action, dated Aug. 1, 2022, 1 page; Taiwanese Patent Office.
Kun, W., et al., "Study on Head Impact Injury Evaluation Index of Vehicle Interior Fittings", Eighth International Conference on Measuring Technology and Mechatronics Automation (ICMTMA), 2016, 6 pages.
Zhang, M., et al., "Laminated Glass", Wiley Encyclopedia of Composites, Second Edition, 2012, 8 pages.
"Loctite Structural Adhesives and NVH Selector Guide". Henkel Loctite, (2013); 32 pages.
ASTM C1279-13 "Standard Test Method for Non-Destructive Photoelastic Measurement of Edge and Surface Stresses in Annealed, Heat-Strengthened, and Fully Tempered Flat Glass"; Downloaded Jan. 24, 2018; 11 Pages.
Product Information Sheet: Corning (Registered) Gorilla (Registered) Glass 3 with Native Damage Resistance (Trademark), Corning Incorporated, 2015, Rev: F_090315, 2 pages.
Japanese Patent Application No. 2020-548968, Office Action, dated Apr. 2, 2023, 9 pages (5 pages of English Translation and 4 pages of Original Copy); Japanese Patent Office.

\* cited by examiner

| | EP21TDCHT-LO Epoxy (1.55 GPa) | EP21TDC-2LO Epoxy (173 MPa) | 3M ScotchWeld 2216 B/A (68 MPa) | 3M ScotchWeld Urethane DP640 (22 MPa) | 3M OCA 8215 PSA (1.34 MPa) | 3M VHB (0.45 MPa) |
|---|---|---|---|---|---|---|
| $E_{adh}$ Flat | | | | | | |
| Frangibility | No crack, only center indent | 6 cracks all the way to edges, no branching | 2 cracks, did not propagate to edges, no branching | 7 cracks, some all the way to edges, no branching | ~10 cracks all the way to edges, no branching | ~20 cracks all the way to edges, no branching |

FIG. 6

| | EP21TDCHT-LO Epoxy (1.55 GPa) | EP21TDC-2LO Epoxy (173 MPa) | 3M ScotchWeld 2216 B/A (68 MPa) | 3M ScotchWeld Urethane DP640 (22 MPa) | 3M OCA 8215 PSA (1.34 MPa) | 3M VHB (0.45 MPa) |
|---|---|---|---|---|---|---|
| $E_{adh}$ R100 Concave | | Not tested | Not tested | Not tested | Not tested | |
| Frangibility | 100's of cracks all to way to edges including branching over entire surface | | | | | 100's of cracks all to way to edges including branching over entire surface |

FIG. 7

| | EP21TDCHT-LO Epoxy (1.55 GPa) | EP21TDC-2LO Epoxy (173 MPa) | 3M ScotchWeld 2216 B/A (68 MPa) | 3M ScotchWeld Urethane DP640 (22 MPa) | 3M OCA 8215 PSA (1.34 MPa) | 3M VHB (0.45 MPa) |
|---|---|---|---|---|---|---|
| $E_{adh}$ R250 Concave | | Not tested | Not tested | Not tested | | |
| Frangibility | 4 cracks all the way to edges, no branching | | | | 100's of cracks all to way to edges including branching over entire surface | 100's of cracks all to way to edges including branching over entire surface |

FIG. 8

| | EP21TDCHT-LO Epoxy (1.55 GPa) | EP21TDC-2LO Epoxy (173 MPa) | 3M ScotchWeld 2216 B/A (68 MPa) | 3M ScotchWeld Urethane DP640 (22 MPa) | 3M OCA 8215 PSA (1.34 MPa) | 3M VHB (0.45 MPa) |
|---|---|---|---|---|---|---|
| $E_{adh}$ R250 Concave | | Not tested | | Not tested | | |
| Frangibility | 6 cracks, some all the way to edges, no branching | | ~10 cracks all the way to edges, no branching | | 100's of cracks all to way to edges including branching over entire surface | 100's of cracks all to way to edges including branching over entire surface |

FIG. 9

VEHICLE INTERIOR SYSTEMS HAVING A CRACK RESISTANT CURVED COVER GLASS AND METHODS FOR FORMING THE SAME

CROSS-REFERENCE TO RELATED APPLICATIONS

This application is a national stage application under 35 U.S.C. § 371 of International Application No. PCT/US2019/021583, filed on Mar. 11, 2019, which claims the benefit of priority under 35 U.S.C. § 119 of U.S. Provisional Application Ser. No. 62/786,690 filed on Dec. 31, 2018 and of U.S. Provisional Application Ser. No. 62/642,211 filed on Mar. 13, 2018, the contents of which are relied upon and incorporated herein by reference in their entirety.

BACKGROUND

The disclosure relates to vehicle interior systems including glass and methods for forming the same, and more particularly to a cold-formed or cold-bent curved glass article with a crack resistant layer and methods for forming the same.

Vehicle interiors include curved surfaces and can incorporate displays and/or touch panels in such curved surfaces. The materials used to form such curved surfaces are typically limited to polymers, which do not exhibit the durability and optical performance of glass. As such, Applicant has determined that curved glass substrates are desirable, especially when used as covers for displays and/or touch panels. Existing methods of forming such curved glass substrates, such as thermal forming, have drawbacks including high cost, optical distortion, and surface marking. Applicant has identified a need for vehicle interior systems that can incorporate a curved glass substrate in a cost-effective manner and without problems typically associated with glass thermal forming processes, and while also having the mechanical performance to pass industry-standard safety tests and regulations.

SUMMARY

One embodiment of the disclosure relates to a vehicle interior system including a frame comprising a curved support surface and a glass substrate coupled to the curved support surface of the frame. The glass substrate including a first major surface, a second major surface, a minor surface connecting the first major surface and the second major surface and a thickness in a range from 0.05 mm to 2 mm. The first major surface of the glass substrate includes a curved section and the second major surface of the curved glass substrate includes a curved section. The curved section of the first major surface includes a first radius of curvature greater than 30 mm and less than 1.5 m. The vehicle system includes a layer of a high modulus adhesive located on the second major surface. The high modulus adhesive has a modulus of elasticity of at least 500 MPa. An outer region of the high modulus adhesive layer bonds the glass substrate to the curved support surface of the frame.

Another embodiment of the disclosure relates to a shatter resistant, cold-formed glass article including a first major surface, a second major surface and a thickness measured between the first major surface and the second major surface of 0.05 mm to 2 mm. The glass article includes a layer of high modulus adhesive located on the second major surface, wherein the high modulus adhesive has a modulus of elasticity of at least 500 MPa. The glass article includes a surface treatment located on the first major surface. The first major surface includes a curved section and the second major surface includes a curved section. The curved section of the first major surface includes a first radius of curvature greater than 30 mm and less than 1.5 m.

Another embodiment of the disclosure relates to a method of forming a vehicle interior system. The method includes applying a high modulus adhesive to a glass substrate. The glass substrate has a first major surface and a second major surface opposite the first major surface. The second major surface of the glass substrate faces a curved support surface of a frame, and the high modulus adhesive is applied to the second major surface. The high modulus adhesive has a modulus of elasticity of at least 500 MPa. The method includes applying a force to the glass substrate causing the glass substrate to bend into conformity with a curved shape of the curved support surface of the frame such that a curved glass substrate is formed. The first major surface of the curved glass substrate includes a curved section and the second major surface of the curved glass substrate includes a curved section. During application of the force, a maximum temperature of the glass substrate is less than a glass transition temperature of the glass substrate. The method includes curing the high modulus adhesive while applying the force such that the glass substrate is bonded to the frame and is maintained in the curved shape.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 6 is a table including images of crack formation following an impact test on various glass articles having different adhesive layers.

FIG. 7 is a table including images of crack formation following an impact test on various glass articles having different adhesive layers.

FIG. 8 is a table including images of crack formation following an impact test on various glass articles having different adhesive layers.

FIG. 9 is a table including images of crack formation following an impact test on various glass articles having different adhesive layers.

DETAILED DESCRIPTION

Figure 1:
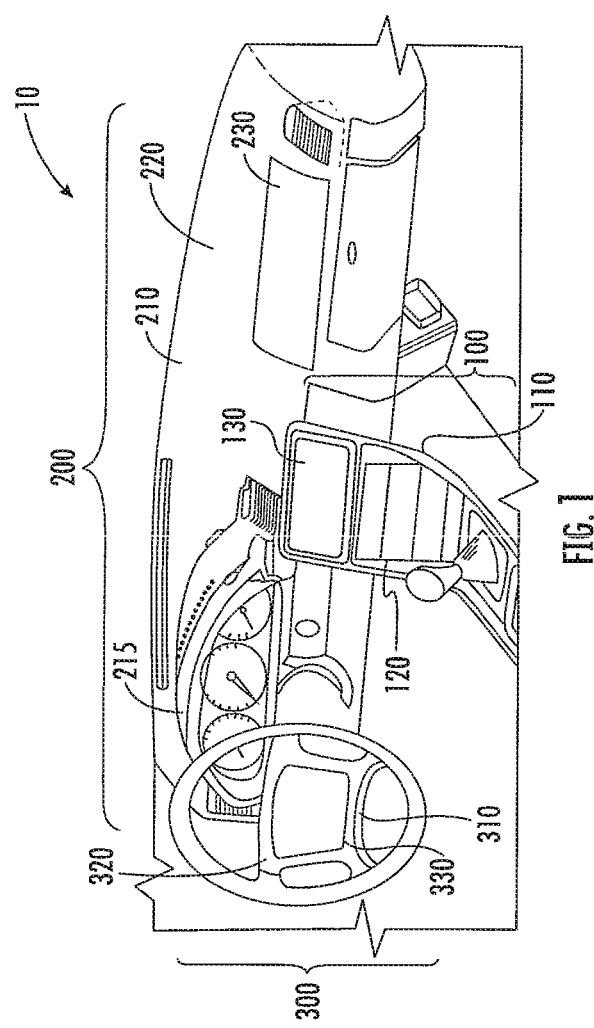
FIG. 1 is a perspective view of a vehicle interior with vehicle interior systems, according to exemplary embodiments.

Reference will now be made in detail to various embodiments, examples of which are illustrated in the accompanying drawings. In general, a vehicle interior system may include a variety of different curved surfaces that are designed to be transparent, such as curved display surfaces, and the present disclosure provides articles and methods for forming these curved surfaces from a glass material. Forming curved vehicle surfaces from a glass material may provide a number of advantages compared to the typical curved plastic panels that are conventionally found in vehicle interiors. For example, glass is typically considered to provide enhanced functionality and user experience for many curved cover material applications, such as display applications and touch screen applications, compared to plastic cover materials.

While glass provides these benefits, glass surfaces in vehicle interiors should also meet performance criteria for both passenger safety and ease of use. For example, certain regulations (e.g., ECE R 21 & FMVSS201) require vehicle interiors to pass the Headform Impact Test (HIT). The HIT involves subjecting a vehicle interior component, such as a display, to an impact from a mass under certain specific conditions. The mass used is an anthropomorphic headform. The HIT is intended to simulate the impact of the head of a driver or passenger against the vehicle interior component. The criteria for passing the test includes the force of the deceleration of the headform not exceeding 80 g (g-force) for longer than a 3 ms period, and the peak deceleration of the headform being less than 120 g. As used in the context of the HIT, "deceleration" refers to the deceleration of the headform as it is stopped by the vehicle interior component. Besides these regulatory requirements, there are additional concerns when using glass under these conditions. For example, it may be desirable for the glass to remain intact and not fracture when subjected to the impact from the HIT. In some cases, it may be acceptable for the glass to fracture, but the fractured glass should behave in a way to reduce the chance of causing lacerations on a real human head. In the HIT, laceration potential can be simulated by wrapping the headform in a substitute material representing human skin, such as a fabric, leather, or other material. In this way, laceration potential can be estimated based on the tears or holes formed in the substitute material. Thus, in the case where the glass fractures, it may be desirable to decrease the chance of laceration by controlling how the glass fractures.

Accordingly, as will be discussed in more detail below, Applicant has developed a glass article that includes a relatively thin, high modulus adhesive coating (e.g., a high modulus polymer) on one of the major surfaces of the glass substrate. In contrast to the low modulus polymer materials commonly used in various glass applications (e.g., polymer interlayers, such as PVB interlayers, in glass laminate applications), Applicant has found that using a high modulus adhesive material (e.g., one with a modulus of elasticity greater than 500 MPa) limits or prevents crack formation and/or propagation with the glass substrate. The high modulus layer also provides for improved glass retention, which improves laceration characteristics.

Further, Applicant has found that even when the glass substrate is formed from strengthened glass, the crack-reducing high modulus adhesive material is advantageous because bending of the glass introduces stresses that reduce compressive surface stress (CS) on the surface with the convex curve. Thus, the crack-reducing high modulus adhesive material discussed herein acts to limit crack formation/propagation even in the presence of these bending stresses. In addition to improved crack resistance, the high modulus layer protects covered glass surfaces from manufacturing/handling defects. Any defects/cracks on the glass surface covered with the high modulus adhesive layer will be effectively captured, thereby improving the HIT performance of the glass article.

In particular, the use of the high modulus adhesive layer as discussed herein enables a wider design window for cold bent glass in automotive interiors. Glass, including cold bent glass, is prone to frangibility from a local sharp impact. The high modulus adhesive layer discussed herein minimizes the crack propagation in the glass article, thereby reducing cracking. The high modulus adhesive layer also helps to retain cracked pieces of glass, decreasing laceration risk. Further, high modulus adhesive materials have high tensile and shear strength, and can withstand tensile and shear forces that the cold bent glass may be exposed to through the lifetime in the vehicle.

Further in typical processes, curved glass articles are formed using hot forming processes. As discussed herein a variety of curved glass articles and processes for making the same are provided that avoid the deficiencies of the typical glass hot-forming process. For example, hot-forming processes are energy intensive and increase the cost of forming a curved glass component, relative to the cold-bending process discussed herein. In addition, hot-forming processes typically make application of glass surface treatments, such as anti-reflective coatings, significantly more difficult. For example, many coating materials cannot be applied to a flat piece of glass material prior to the hot-forming process because the coating material typically will not survive the high temperatures of the hot-forming process. Further, application of a coating material to surfaces of a curved glass substrate after hot-bending is substantially more difficult than application to a flat glass substrate. In addition, Applicant believes that by avoiding the additional high temperature heating steps needed for thermal forming, the glass articles produced via the cold-forming processes and systems discussed herein have improved optical properties and/or improved surface properties than similarly shaped glass articles made via thermal-shaping processes.

Thus, for at least these reasons, Applicant believes that the glass article and processes for making the glass articles discussed herein provide for various combinations of benefits and properties not previously achievable with either non-glass articles for vehicle systems or with previously developed glass articles.

FIG. 1 shows an exemplary vehicle interior 10 that includes three different embodiments of a vehicle interior system 100, 200, 300. Vehicle interior system 100 includes a frame, shown as center console base 110, with a curved surface 120 including a curved display 130. Vehicle interior system 200 includes a frame, shown as dashboard base 210, with a curved surface 220 including a curved display 230. The dashboard base 210 typically includes an instrument panel 215 which may also include a curved display. Vehicle interior system 300 includes a frame, shown as steering wheel base 310, with a curved surface 320 and a curved display 330. In one or more embodiments, the vehicle interior system may include a frame that is an arm rest, a pillar, a seat back, a floor board, a headrest, a door panel, or any portion of the interior of a vehicle that includes a curved surface.

The embodiments of the curved glass article described herein can be used interchangeably in each of vehicle interior systems 100, 200 and 300. Further, the curved glass articles discussed herein may be used as curved cover glasses for any of the curved display embodiments discussed herein, including for use in vehicle interior systems 100, 200 and/or 300. Further, in various embodiments, various non-display components of vehicle interior systems 100, 200 and 300 may be formed from the glass articles discussed herein. In some such embodiments, the glass articles discussed herein may be used as the non-display cover surface for the dashboard, center console, door panel, etc. In such embodiments, glass material may be selected based on its weight, aesthetic appearance, etc. and may be provided with a coating (e.g., an ink or pigment coating) with a pattern (e.g., a brushed metal appearance, a wood grain appearance, a leather appearance, a colored appearance, etc.) to visually match the glass components with adjacent non-glass components. In specific embodiments, such ink or pigment coating may have a transparency level that provides for deadfront functionality.

Figure 2:
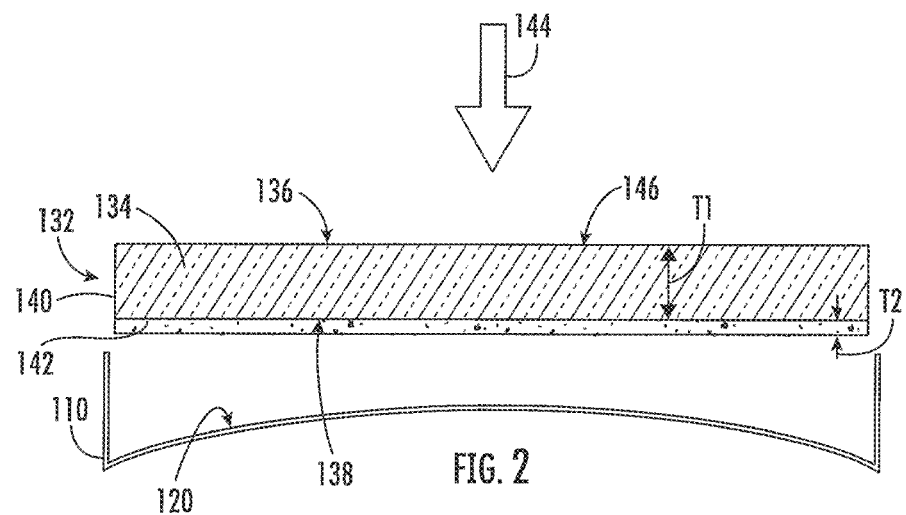
FIG. 2 is a cross-sectional view illustration of a glass substrate including a high modulus adhesive layer prior to cold bending and mounting to a curved frame of a vehicle interior system, according to an exemplary embodiment.
Figure 3:
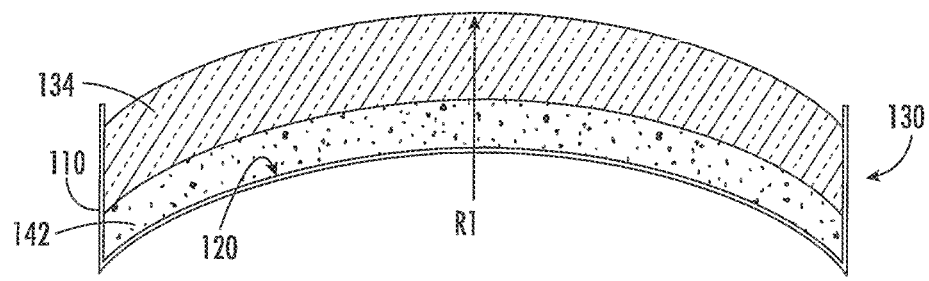
FIG. 3 is a cross-sectional view of the glass substrate of FIG. 2 following cold bending and attachment to the curved frame of FIG. 2, according to an exemplary embodiment.
Figure 4:
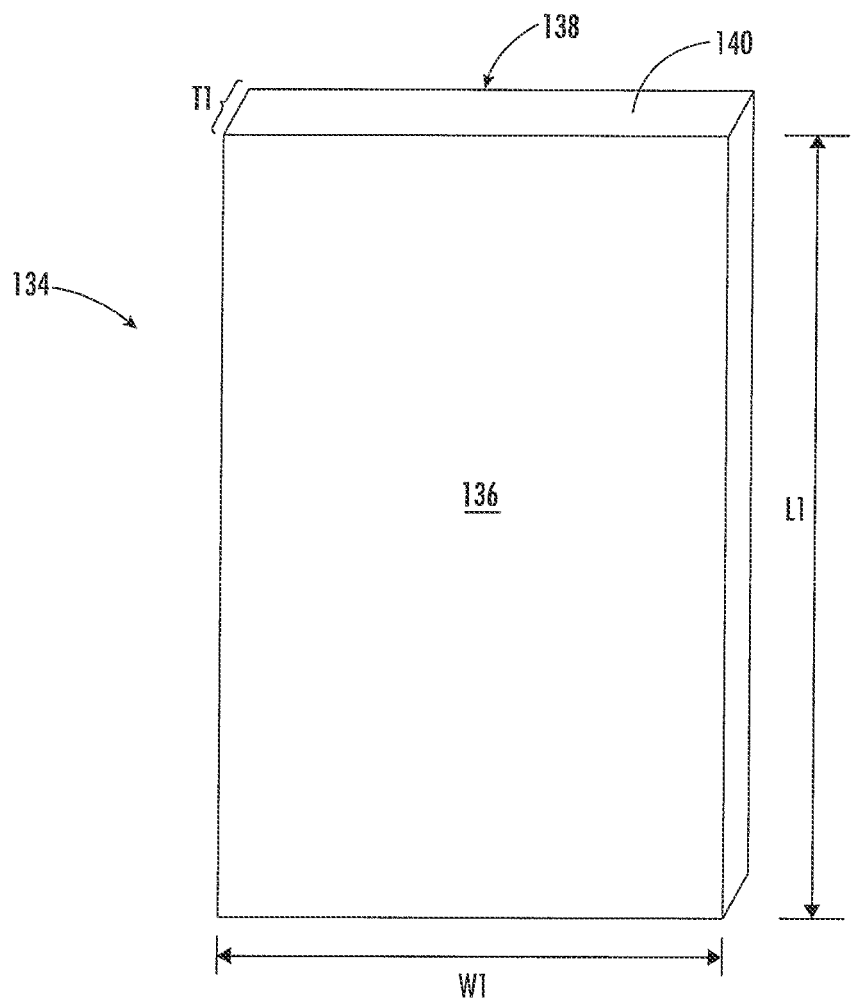
FIG. 4 is a front perspective view of the glass substrate of FIG. 2, according to an exemplary embodiment.

As shown in FIGS. 2-4, formation of a curved glass article, such as the cover glass for curved display 130, is shown according to an exemplary embodiment. It should be understood that while FIGS. 2-4 are described in terms of forming curved display 130, the curved glass article of FIGS. 2-4 may be used from any suitable curved glass application, including any curved glass component of the vehicle interior systems of FIG. 1.

Referring to FIGS. 2 and 3, a frame, shown as center console base 110, includes a curved support surface, shown as curved surface 120. Display 130 includes a glass article, shown as a cover panel 132. Cover panel 132 includes a glass substrate 134. Glass substrate 134 includes a first major surface 136 and a second major surface 138 opposite first major surface 136. A minor surface 140 connects the first major surface 136 and the second major surface 138, and in specific embodiments, minor surface 140 defines the outer perimeter of glass substrate 134. A high modulus adhesive layer 142 is located on second major surface 138, and as will be discussed in more detail below, high modulus adhesive layer 142 provides for crack and/or shatter resistances, glass shard retention and also bonds the glass substrate to curved support surface 120 of center console base 110.

In various embodiments, cover panel 132 is cold formed or cold bent to the desired curved shape, which in this case is determined by the curved shape of support surface 120. As shown in FIG. 3, following cold bending, cover panel 132 has a curved shape such that first major surface 136 and second major surface 138 each include at least one curved section having a radius of curvature. In the specific embodiments shown, curved surface 120 is convex curved surface. In such embodiments, cover panel 132 is bent such that first major surface 136 defines a convex shape defining a first radius of curvature R1. In the specific embodiment shown, second major surface 138 defines a concave shape that generally conforms to the convex curved shape of support surface 120 and includes a radius of curvature that generally matches R1.

In general, R1 is selected based on the shape of the associated vehicle interior frame, and in general R1 is between 30 mm and 1.5 m. In addition, glass substrate 134 has a thickness T1 (e.g., an average thickness measured between surfaces 136 and 138) shown in FIG. 2 that is in a range from 0.05 mm to 2 mm. In specific embodiments, T1 is less than or equal to 1.5 mm and in more specific embodiments, T1 is 0.3 mm to 0.7 mm. Applicant has found that such thin glass substrates can be cold formed to a variety of curved shapes (including the relatively high curvature radii of curvature discussed herein) utilizing cold forming without breakage while at the same time providing for a high quality cover layer for a variety of vehicle interior applications. In addition, such a thin glass substrate 134 may deform more readily, which could potentially compensate for shape mismatches and gaps that may exist relative to support surface 120 and/or center console base 110.

As noted above, high modulus adhesive layer 142 is formed from a high modulus material that is applied, coated and/or bonded to second major surface 138. In various embodiments, a high modulus adhesive layer is formed from a polymer adhesive material having a modulus of elasticity of at least 500 MPa. In some such embodiments, a high modulus adhesive layer is formed from a polymer adhesive material having a modulus of elasticity of less than 5 GPa. In even more specific embodiments, a high modulus adhesive layer is formed from a polymer adhesive material having a modulus of elasticity of 750 MPa to 3 GPa. Applicant has found that, in contrast to the low modulus polymer materials typically used for glass laminate interlayers (e.g., PVB interlayers typically have a modulus of elasticity of 10 MPa or less), the high modulus material surprisingly limits crack formation and crack propagation through glass article, such as cover panel 132.

Adhesive layer 142 may be formed from a variety of adhesive materials having the high modulus as discussed herein. In various embodiments, adhesive layer 142 is formed from a high modulus epoxy material or a high modulus acrylic, and in a specific embodiment, adhesive layer 142 is formed from a high modulus toughened epoxy material or toughened acrylic material. In specific embodiments, adhesive layer 142 is formed from Masterbond EP21TDCHT-LO Epoxy. In other specific embodiments, adhesive layer 142 is formed from LORD 850 and 852 Toughened Structural Acrylic adhesives with LORD Accelerator 25 GB.

In various embodiments, the material of high modulus adhesive layer 142 is made non-brittle by the addition of a toughening agent. In specific embodiments, in which adhesive layer is formed from an epoxy materials the toughening agent is one or more liquid functional rubbers (e.g., carboxy-terminated polybutadiene (CTPB)), copolymers of amino-terminated butadiene and acrylonitrile (ATBN), carboxy-terminated butadiene and acrylonitrile (CTBN), etc. For acrylic adhesives, PCT Publication WO 97/39074, which is incorporated herein by reference in its entirety, discloses the use of at least one polymeric material which can act as a toughening agent such as polychloroprene, polymer-in-monomer syrup, chlorosulphonated polyethylene rubber, copolymers of butadiene and at least one monomer copolymerizable therewith, for example, styrene, acrylonitrile, methacrylonitrile (e.g. poly(butadiene-(meth)acrylonitrile or poly(butadiene-(meth)acrylonitrile-styrene) and mixtures thereof; as well as modified elastomeric polymeric materials, such as butadiene homopolymers and copolymers as noted above modified by copolymerization therewith of trace amounts of up to about 5 percent by weight of the elastomeric material of at leak one functional monomer (such as acrylic acid, methacrylic acid, maleic anhydride, fumaric acid, styrene, and methyl methacrylate to give, for example, methacrylate-terminated poly butadiene homopolymers and/or copolymers).

Applicant has also found that this crack limiting functionality can be provided to a glass article, such as cover panel 132, with an adhesive layer 142 having a surprisingly low thickness. As shown in FIG. 2, adhesive layer 142 has a thickness T2 shown in FIG. 2. In various embodiments, T2 may refer to an average thickness or a maximum thickness of adhesive layer 142.

In various embodiments, T2 is less than 1 mm. In even more specific embodiments, T2 is 25 µm to 500 µm. In some embodiments, T2 is in a range from about 200 µm to about 500 µm, from about 225 µm to about 500 µm, from about 250 µm to about 500 µm, from about 275 µm to about 500 µm, from about 300 µm to about 500 µm, from about 325 µm to about 500 µm, from about 350 µm to about 500 µm, from about 375 µm to about 500 µm, from about 400 µm to about 500 µm, from about 200 µm to about 475 µm, from about 200 µm to about 450 µm, from about 200 µm to about 425 µm, from about 200 µm to about 400 µm, from about 200 µm to about 375 µm, from about 200 µm to about 350 µm, from about 200 µm to about 325 µm, from about 200 µm to about 300 µm, or from about 225 µm to about 275 µm. In other embodiments, T2 falls within any one of the exact numerical ranges set forth in this paragraph.

In various embodiments, adhesive layer 142 is a continuous and contiguous layer covering all or substantially all (e.g., at least 95%) of surface 138 of glass substrate 134. In other embodiments, adhesive layer 142 may be applied in a discontinuous or patterned arrangement that provides sufficient coverage to provide the crack resistance and other functions discussed herein. In some embodiments, adhesive layer 142 is applied in a webbed pattern, a cross-hatched pattern, a dot pattern, etc. in which regions of adhesive layer 142 are adjacent to portions of surface 138 that are not covered with adhesive layer 142.

In various embodiments, first major surface 136 and/or the second major surface 138 of glass substrate includes a surface treatment 146. Surface treatment 146 may cover at least a portion of the first major surface 136 and/or second major surface 138. Exemplary surface treatments include anti-glare surfaces/coatings, anti-reflective surfaces/coatings, and a pigment design. In one or more embodiments, at least a portion of the first major surface 136 and/or the second major surface 138 may include any one, any two or all three of an anti-glare surface, an anti-reflective surface, and a pigment design. For example, first major surface 136 may include an anti-glare surface and second major surface 138 may include an anti-reflective surface. In another example, first major surface 136 includes an anti-reflective surface and second major surface 138 includes an anti-glare surface. In yet another example, first major surface 136 comprises either one of or both the anti-glare surface and the anti-reflective surface, and second major surface 138 includes the pigment design.

The pigment design may include any aesthetic design formed from a pigment (e.g., ink, paint and the like) and can include a wood-grain design, a brushed metal design, a graphic design, a portrait, or a logo. The pigment design may be printed onto the glass substrate. In one or more embodiments, the anti-glare surface includes an etched surface. In one or more embodiments, the anti-reflective surface includes a multi-layer coating.

Referring to FIGS. 2 and 3, a method of cold forming a glass article, such as cover panel 132, is shown. As used herein, the terms "cold-bent," "cold bending," "cold-formed" or "cold forming" refers to curving the glass substrate at a cold-form temperature which is less than the glass transition temperature of the glass material of glass substrate 134. As shown in FIG. 2, high modulus material is applied to second major surface 138 of glass substrate 134 to form high modulus adhesive layer 142. A force, shown as force 144 is applied to glass substrate 134 causing glass substrate 134 to bend into substantial conformity with the curved support surface 120 (e.g., R1 is within 10% of the radius of curvature of support surface 120). In specific embodiments, force 144 is applied following formation of adhesive layer 142.

Application of force 144 causes glass substrate 134 to adopt a curved shape, such as the shape shown in FIG. 3 and/or described in various embodiments herein. During application of force 144, a maximum temperature of glass substrate 134 is less than a glass transition temperature of the glass material of glass substrate 134. Force 144 may be applied by any suitable mechanism, such as a mechanical press, a vacuum, etc. In various embodiments, the temperature of the glass substrate 134 is maintained below 500 degrees C., 400 degrees C., 300 degrees C., 200 degrees C. or 100 degrees C. In a particular embodiment, the glass substrate is maintained at or below room temperature during bending. In a particular embodiment, the glass substrate is not actively heated via a heating element, furnace, oven, etc. during bending, as is the case when applying hot-forming glass to a curved shape.

While force 144 is being applied, the adhesive material of adhesive layer 142 is cured such that glass substrate 134 is bonded to curved support surface 120. Because the bonding occurs during application of force 144, the bond is formed while glass substrate 134 has been bent to the curved shape shown in FIG. 3. Once the adhesive material is cured, the adhesive material of adhesive layer 142 holds glass substrate 134 in the curved shape. In this manner, adhesive layer 142 provides for combined functionality, crack resistance as discussed herein and bonding to the associated frame support structure.

As will be understood, curing of adhesive layer 142 will depend on the type of adhesive material used to form adhesive layer 142. In specific embodiments, the adhesive material of adhesive layer 142 is a room temperature or thermally cured material, and the curing step involves application of temperature/heat to cure adhesive layer 142. In other specific embodiments, depending on the adhesive material of adhesive layer 142, cure mechanisms could include radiation curing, change of pH, use of catalysts, activators or moisture.

In various embodiments, glass substrate 134 is formed from a strengthened glass sheet (e.g., a thermally strengthened glass material, a chemically strengthened glass sheet, etc.). In such embodiments, when glass substrate 134 is formed from a strengthened glass material, first major surface 136 and second major surface 138 are under compressive stress, and thus first major surface 136 can experience greater tensile stress during bending without risking fracture. This allows for strengthened glass substrate 134 to conform to more tightly curved surfaces.

A feature of a cold-formed glass substrate is an asymmetric surface compressive stress between the first major surface 136 and the second major surface 138 once the glass substrate has been bent to the curved shape. In such embodiments, prior to the cold-forming process or being cold-formed, the respective compressive stresses in the first major surface 136 and the second major surface 138 of glass substrate 134 are substantially equal. After cold-forming, the compressive stress on concave second major surface 138 increases such that the compressive stress on the second major surface 138 is greater after cold-forming than before cold-forming. In contrast, convex first major surface 136 experiences tensile stresses during bending causing a net decrease in surface compressive stress on surface 136, such that the compressive stress in surface 136 following bending is less than the compressive stress in surface 136 when the glass sheet is flat.

As noted above, in addition to providing processing advantages such as eliminating expensive and/or slow heating steps, the cold-forming processes discussed herein are believed to generate curved glass articles with a variety of properties that are superior to hot-formed glass articles, particularly for vehicle interior or display cover glass applications. For example, Applicant believes that, for at least some glass materials, heating during hot-forming processes decreases optical properties of curved glass sheets, and thus, the curved glass substrates formed utilizing the cold-bending processes/systems discussed herein provide for both curved glass shape along with improved optical qualities not believed achievable with hot-bending processes.

Further, many glass surface treatments (e.g., anti-glare coatings, anti-reflective coatings, etc.) are applied via deposition processes, such as sputtering processes, that are typically ill-suited for coating curved glass articles. In addition, many surface treatments (e.g., anti-glare coatings, anti-reflective coatings, decorative coatings, etc.) also are not able to survive the high temperatures associated with hot-bending processes. Thus, in particular embodiments discussed herein, one or more surface treatments are applied to major surface 136 and/or to major surface 138 of glass substrate 134 prior to cold-bending, and glass substrate 134 including the surface treatment is bent to a curved shape as discussed herein. Thus, Applicant believes that the processes and systems discussed herein allow for bending of glass after one or more coating materials have been applied to the glass, in contrast to typical hot-forming processes.

In various embodiments, a cold-formed glass substrate 134 may have a compound curve including a major radius and a cross curvature. A complexly curved cold-formed glass substrate 134 may have a distinct radius of curvature in two independent directions. According to one or more embodiments, a complexly curved cold-formed glass substrate 134 may thus be characterized as having "cross curvature," where the cold-formed glass substrate 134 is curved along an axis (i.e., a first axis) that is parallel to a given dimension and also curved along an axis (i.e., a second axis) that is perpendicular to the same dimension. The curvature of the cold-formed glass substrate and the curved display can be even more complex when a significant minimum radius is combined with a significant cross curvature, and/or depth of bend.

Referring to FIG. 4, additional structural details of glass substrate 134 are shown and described. As noted above, glass substrate 134 has a thickness T1 that is substantially constant and is defined as a distance between the first major surface 136 and the second major surface 138. In various embodiments, T1 may refer to an average thickness or a maximum thickness of the glass substrate. In addition, glass substrate 134 includes a width W1 defined as a first maximum dimension of one of the first or second major surfaces orthogonal to the thickness T1, and a length L1 defined as a second maximum dimension of one of the first or second surfaces orthogonal to both the thickness and the width. In other embodiments, W1 and L1 may be the average width and the average length of glass substrate 134, respectively.

In various embodiments, thickness T1 is 1.5 mm or less. For example, thickness T1 may be in a range from about 0.1 mm to about 1.5 mm, from about 0.15 mm to about 1.5 mm, from about 0.2 mm to about 1.5 mm, from about 0.25 mm to about 1.5 mm, from about 0.3 mm to about 1.5 mm, from about 0.35 mm to about 1.5 mm, from about 0.4 mm to about 1.5 mm, from about 0.45 mm to about 1.5 mm, from about 0.5 mm to about 1.5 mm, from about 0.55 mm to about 1.5 mm, from about 0.6 mm to about 1.5 mm, from about 0.65 mm to about 1.5 mm, from about 0.7 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1.05 mm, from about 0.1 mm to about 1 mm, from about 0.1 mm to about 0.95 mm, from about 0.1 mm to about 0.9 mm, from about 0.1 mm to about 0.85 mm, from about 0.1 mm to about 0.8 mm, from about 0.1 mm to about 0.75 mm, from about 0.1 mm to about 0.7 mm, from about 0.1 mm to about 0.65 mm, from about 0.1 mm to about 0.6 mm, from about 0.1 mm to about 0.55 mm, from about 0.1 mm to about 0.5 mm, from about 0.1 mm to about 0.4 mm, or from about 0.3 mm to about 0.7 mm. In other embodiments, the T1 falls within any one of the exact numerical ranges set forth in this paragraph.

In various embodiments, width W1 is in a range from 5 cm to 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm. In other embodiments, W1 falls within any one of the exact numerical ranges set forth in this paragraph.

In various embodiments, length L1 is in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm. In other embodiments, L1 falls within any one of the exact numerical ranges set forth in this paragraph.

In various embodiments, one or more radius of curvature (e.g., R1 shown in FIG. 3) of glass substrate 134 is about 60 mm or greater. For example, R1 may be in a range from about 60 mm to about 1500 mm, from about 70 mm to about 1500 mm, from about 80 mm to about 1500 mm, from about 90 mm to about 1500 mm, from about 100 mm to about 1500 mm, from about 120 mm to about 1500 mm, from about 140 mm to about 1500 mm, from about 150 mm to about 1500 mm, from about 160 mm to about 1500 mm, from about 180 mm to about 1500 mm, from about 200 mm to about 1500 mm, from about 220 mm to about 1500 mm, from about 240 mm to about 1500 mm, from about 250 mm to about 1500 mm, from about 260 mm to about 1500 mm, from about 270 mm to about 1500 mm, from about 280 mm to about 1500 mm, from about 290 mm to about 1500 mm, from about 300 mm to about 1500 mm, from about 350 mm to about 1500 mm, from about 400 mm to about 1500 mm, from about 450 mm to about 1500 mm, from about 500 mm to about 1500 mm, from about 550 mm to about 1500 mm, from about 600 mm to about 1500 mm, from about 650 mm to about 1500 mm, from about 700 mm to about 1500 mm, from about 750 mm to about 1500 mm, from about 800 mm to about 1500 mm, from about 900 mm to about 1500 mm, from about 9500 mm to about 1500 mm, from about 1000 mm to about 1500 mm, from about 1250 mm to about 1500 mm, from about 60 mm to about 1400 mm, from about 60 mm to about 1300 mm, from about 60 mm to about 1200 mm, from about 60 mm to about 1100 mm, from about 60 mm to about 1000 mm, from about 60 mm to about 950 mm, from about 60 mm to about 900 mm, from about 60 mm to about 850 mm, from about 60 mm to about 800 mm, from about 60 mm to about 750 mm, from about 60 mm to about 700 mm, from about 60 mm to about 650 mm, from about 60 mm to about 600 mm, from about 60 mm to about 550 mm, from about 60 mm to about 500 mm, from about 60 mm to about 450 mm, from about 60 mm to about 400 mm, from about 60 mm to about 350 mm, from about 60 mm to about 300 mm, or from about 60 mm to about 250 mm. In other embodiments, R1 falls within any one of the exact numerical ranges set forth in this paragraph.

Figure 5:
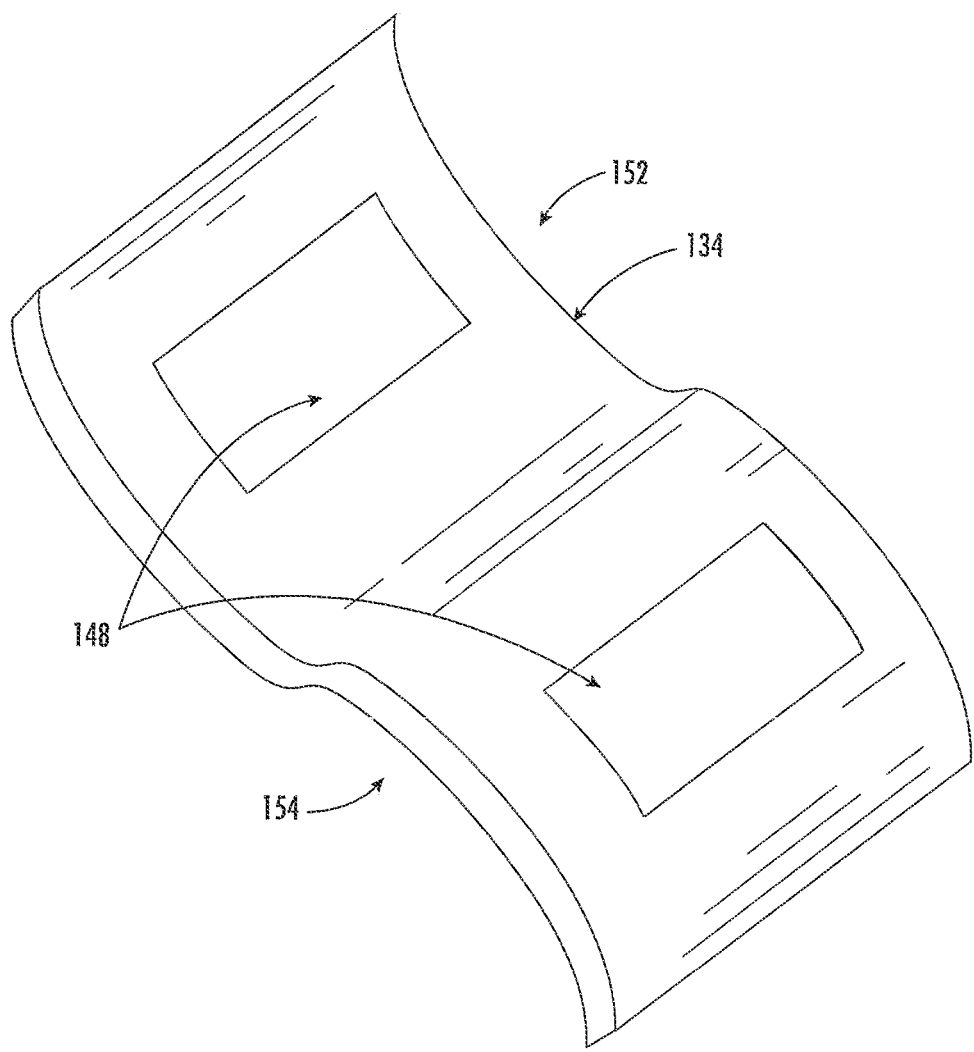
FIG. 5 is a perspective view of a curved glass substrate according to an exemplary embodiment.

As shown in FIG. 5, glass substrate 134 can include one or more regions 148 intended to show a display (e.g., an electronic display). In addition, a glass substrate according to some embodiments can be curved in multiple regions 152 and 154 of the glass substrate and in multiple directions (i.e., the glass substrate can be curved about different axes that may or may not be parallel) as shown in FIG. 5. Accordingly, shapes and forms of the possible embodiments are not limited to the examples shown herein. This is an example of curved cover glass substrate that can be used with multiple embodiments discussed herein. Glass substrate 134 of these embodiments can have a complex surface including multiple different shapes including one or more flat sections, one or more conical sections, one or more cylindrical sections, one or more spherical sections, etc.

The various embodiments of the vehicle interior system may be incorporated into vehicles such as trains, automobiles (e.g., cars, trucks, buses and the like), sea craft (boats, ships, submarines, and the like), and aircraft (e.g., drones, airplanes, jets, helicopters and the like).

Strengthened Glass Properties

As noted above, glass substrate 134 may be strengthened. In one or more embodiments, glass substrate 134 may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In various embodiments, glass substrate 134 may be strengthened mechanically by utilizing a mismatch of the coefficient of thermal expansion between portions of the article to create a compressive stress region and a central region exhibiting a tensile stress. In some embodiments, the glass substrate may be strengthened thermally by heating the glass to a temperature above the glass transition point and then rapidly quenching.

In various embodiments, glass substrate 134 may be chemically strengthened by ion exchange. In the ion exchange process, ions at or near the surface of the glass substrate are replaced by—or exchanged with—larger ions having the same valence or oxidation state. In those embodiments in which the glass substrate comprises an alkali aluminosilicate glass, ions in the surface layer of the article and the larger ions are monovalent alkali metal cations, such as $Li^+$, $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into the glass substrate generate a stress.

Ion exchange processes are typically carried out by immersing a glass substrate in a molten salt bath (or two or more molten salt baths) containing the larger ions to be exchanged with the smaller ions in the glass substrate. It should be noted that aqueous salt baths may also be utilized. In addition, the composition of the bath(s) may include more than one type of larger ion (e.g., Na+ and K+) or a single larger ion. It will be appreciated by those skilled in the art that parameters for the ion exchange process, including, but not limited to, bath composition and temperature, immersion time, the number of immersions of the glass substrate in a salt bath (or baths), use of multiple salt baths, additional steps such as annealing, washing, and the like, are generally determined by the composition of the glass substrate (including the structure of the article and any crystalline phases present) and the desired DOC and CS of the glass substrate that results from strengthening. Exemplary molten bath composition may include nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass substrate thickness, bath temperature and glass (or monovalent ion) diffusivity. However, temperatures and immersion times different from those described above may also be used.

In one or more embodiments, the glass substrates may be immersed in a molten salt bath of 100% NaNO$_3$, 100% KNO$_3$, or a combination of NaNO$_3$ and KNO$_3$ having a temperature from about 370° C. to about 480° C. In some embodiments, the glass substrate may be immersed in a molten mixed salt bath including from about 5% to about 90% KNO$_3$ and from about 10% to about 95% NaNO$_3$. In one or more embodiments, the glass substrate may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass substrate may be immersed in a molten, mixed salt bath including NaNO$_3$ and KNO$_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass substrate. The spike may result in a greater surface CS value. This spike can be achieved by single bath or multiple baths, with the bath(s) having a single composition or mixed composition, due to the unique properties of the glass compositions used in the glass substrates described herein.

In one or more embodiments, where more than one monovalent ion is exchanged into the glass substrate, the different monovalent ions may exchange to different depths within the glass substrate (and generate different magnitudes stresses within the glass substrate at different depths). The resulting relative depths of the stress-generating ions can be determined and cause different characteristics of the stress profile.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass substrate. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from Glasstress Ltd., located in Tallinn Estonia), depending on the strengthening method and conditions. When the glass substrate is chemically strengthened by an ion exchange treatment, FSM or SCALP may be used depending on which ion is exchanged into the glass substrate. Where the stress in the glass substrate is generated by exchanging potassium ions into the glass substrate, FSM is used to measure DOC. Where the stress is generated by exchanging sodium ions into the glass substrate, SCALP is used to measure DOC. Where the stress in the glass substrate is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass substrates is measured by FSM. Central tension or CT is the maximum tensile stress and is measured by SCALP.

In one or more embodiments, the glass substrate may be strengthened to exhibit a DOC that is described as a fraction of the thickness T1 of the glass substrate (as described herein). For example, in one or more embodiments, the DOC may be equal to or greater than about 0.05T1, equal to or greater than about 0.1T1, equal to or greater than about 0.11T1, equal to or greater than about 0.12T1, equal to or greater than about 0.13T1, equal to or greater than about 0.14T1, equal to or greater than about 0.15T1, equal to or greater than about 0.16T1, equal to or greater than about 0.17T1, equal to or greater than about 0.18T1, equal to or greater than about 0.19T1, equal to or greater than about 0.2T1, equal to or greater than about 0.21T1. In some embodiments, The DOC may be in a range from about 0.08T1 to about 0.25T1, from about 0.09T1 to about 0.25T1, from about 0.18T1 to about 0.25T1, from about 0.11T1 to about 0.25T1, from about 0.12T1 to about 0.25T1, from about 0.13T1 to about 0.25T1, from about 0.14T1 to about 0.25T1, from about 0.15T1 to about 0.25T1, from about 0.08T1 to about 0.24T1, from about 0.08T1 to about 0.23T1, from about 0.08T1 to about 0.22T1, from about 0.08T1 to about 0.21T1, from about 0.08T1 to about 0.2T1, from about 0.08T1 to about 0.19T1, from about 0.08T1 to about 0.18T1, from about 0.08T1 to about 0.17T1, from about 0.08T1 to about 0.16T1, or from about 0.08T1 to about 0.15T1. In some instances, the DOC may be about 20 µm or less. In one or more embodiments, the DOC may be about 40 µm or greater (e.g., from about 40 µm to about 300 µm, from about 50 µm to about 300 µm, from about 60 µm to about 300 µm, from about 70 µm to about 300 µm, from about 80 µm to about 300 µm, from about 90 µm to about 300 µm, from about 100 µm to about 300 µm, from about 110 µm to about 300 µm, from about 120 µm to about 300 µm, from about 140 µm to about 300 µm, from about 150 µm to about 300 µm, from about 40 µm to about 290 µm, from about 40 µm to about 280 µm, from about 40 µm to about 260 µm, from about 40 µm to about 250 µm, from about 40 µm to about 240 µm, from about 40 µm to about 230 µm, from about 40 µm to about 220 µm, from about 40 µm to about 210 µm, from about 40 µm to about 200 µm, from about 40 µm to about 180 µm, from about 40 µm to about 160 µm, from about 40 µm to about 150 µm, from about 40 µm to about 140 µm, from about 40 µm to about 130 µm, from about 40 µm to about 120 µm, from about 40 µm to about 110 µm, or from about 40 µm to about 100 µm. In other embodiments, DOC falls within any one of the exact numerical ranges set forth in this paragraph.

In one or more embodiments, the strengthened glass substrate may have a CS (which may be found at the surface or a depth within the glass substrate) of about 200 MPa or greater, 300 MPa or greater, 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater.

In one or more embodiments, the strengthened glass substrate may have a maximum tensile stress or central tension (CT) of about 20 MPa or greater, about 30 MPa or greater, about 40 MPa or greater, about 45 MPa or greater, about 50 MPa or greater, about 60 MPa or greater, about 70 MPa or greater, about 75 MPa or greater, about 80 MPa or greater, or about 85 MPa or greater. In some embodiments, the maximum tensile stress or central tension (CT) may be in a range from about 40 MPa to about 100 MPa. In other embodiments, CS falls within the exact numerical ranges set forth in this paragraph.

Glass Compositions

Suitable glass compositions for use in glass substrate 134 include soda lime glass, aluminosilicate glass, borosilicate glass, boroaluminosilicate glass, alkali-containing aluminosilicate glass, alkali-containing borosilicate glass, and alkali-containing boroaluminosilicate glass.

Unless otherwise specified, the glass compositions disclosed herein are described in mole percent (mol %) as analyzed on an oxide basis.

In one or more embodiments, the glass composition may include $SiO_2$ in an amount in a range from about 66 mol % to about 80 mol %, from about 67 mol % to about 80 mol %, from about 68 mol % to about 80 mol %, from about 69 mol % to about 80 mol %, from about 70 mol % to about 80 mol %, from about 72 mol % to about 80 mol %, from about 65 mol % to about 78 mol %, from about 65 mol % to about 76 mol %, from about 65 mol % to about 75 mol %, from about 65 mol % to about 74 mol %, from about 65 mol % to about 72 mol %, or from about 65 mol % to about 70 mol %, and all ranges and sub-ranges therebetween.

In one or more embodiments, the glass composition includes $Al_2O_3$ in an amount greater than about 4 mol %, or greater than about 5 mol %. In one or more embodiments, the glass composition includes $Al_2O_3$ in a range from greater than about 7 mol % to about 15 mol %, from greater than about 7 mol % to about 14 mol %, from about 7 mol % to about 13 mol %, from about 4 mol % to about 12 mol %, from about 7 mol % to about 11 mol %, from about 8 mol % to about 15 mol %, from 9 mol % to about 15 mol %, from about 9 mol % to about 15 mol %, from about 10 mol % to about 15 mol %, from about 11 mol % to about 15 mol %, or from about 12 mol % to about 15 mol %, and all ranges and sub-ranges therebetween. In one or more embodiments, the upper limit of $Al_2O_3$ may be about 14 mol %, 14.2 mol %, 14.4 mol %, 14.6 mol %, or 14.8 mol %.

In one or more embodiments, the glass article is described as an aluminosilicate glass article or including an aluminosilicate glass composition. In such embodiments, the glass composition or article formed therefrom includes $SiO_2$ and $Al_2O_3$ and is not a soda lime silicate glass. In this regard, the glass composition or article formed therefrom includes $Al_2O_3$ in an amount of about 2 mol % or greater, 2.25 mol % or greater, 2.5 mol % or greater, about 2.75 mol % or greater, about 3 mol % or greater.

In one or more embodiments, the glass composition comprises $B_2O_3$ (e.g., about 0.01 mol % or greater). In one or more embodiments, the glass composition comprises $B_2O_3$ in an amount in a range from about 0 mol % to about 5 mol %, from about 0 mol % to about 4 mol %, from about 0 mol % to about 3 mol %, from about 0 mol % to about 2 mol %, from about 0 mol % to about 1 mol %, from about 0 mol % to about 0.5 mol %, from about 0.1 mol % to about 5 mol %, from about 0.1 mol % to about 4 mol %, from about 0.1 mol % to about 3 mol %, from about 0.1 mol % to about 2 mol %, from about 0.1 mol % to about 1 mol %, from about 0.1 mol % to about 0.5 mol %, and all ranges and sub-ranges therebetween. In one or more embodiments, the glass composition is substantially free of $B_2O_3$.

As used herein, the phrase "substantially free" with respect to the components of the composition means that the component is not actively or intentionally added to the composition during initial batching, but may be present as an impurity in an amount less than about 0.001 mol %.

In one or more embodiments, the glass composition optionally comprises $P_2O_5$ (e.g., about 0.01 mol % or greater). In one or more embodiments, the glass composition comprises a non-zero amount of $P_2O_5$ up to and including 2 mol %, 1.5 mol %, 1 mol %, or 0.5 mol %. In one or more embodiments, the glass composition is substantially free of $P_2O_5$.

In one or more embodiments, the glass composition may include a total amount of $R_2O$ (which is the total amount of alkali metal oxide such as $Li_2O$, $Na_2O$, $K_2O$, $Rb_2O$, and $Cs_2O$) that is greater than or equal to about 8 mol %, greater than or equal to about 10 mol %, or greater than or equal to about 12 mol %. In some embodiments, the glass composition includes a total amount of $R_2O$ in a range from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 13 mol %, and all ranges and sub-ranges therebetween. In one or more embodiments, the glass composition may be substantially free of $Rb_2O$, $Cs_2O$ or both $Rb_2O$ and $Cs_2O$. In one or more embodiments, the $R_2O$ may include the total amount of $Li_2O$, $Na_2O$ and $K_2O$ only. In one or more embodiments, the glass composition may comprise at least one alkali metal oxide selected from $Li_2O$, $Na_2O$ and $K_2O$, wherein the alkali metal oxide is present in an amount greater than about 8 mol % or greater.

In one or more embodiments, the glass composition comprises $Na_2O$ in an amount greater than or equal to about 8 mol %, greater than or equal to about 10 mol %, or greater than or equal to about 12 mol %. In one or more embodiments, the composition includes $Na_2O$ in a range from about from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 16 mol %, and all ranges and sub-ranges therebetween.

In one or more embodiments, the glass composition includes less than about 4 mol % $K_2O$, less than about 3 mol % $K_2O$, or less than about 1 mol % $K_2O$. In some instances, the glass composition may include $K_2O$ in an amount in a range from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0 mol % to about 0.5 mol %, from about 0 mol % to about 0.2 mol %, from about 0 mol % to about 0.1 mol %, from about 0.5 mol % to about 4 mol %, from about 0.5 mol % to about 3.5 mol %, from about 0.5 mol % to about 3 mol %, from about 0.5 mol % to about 2.5 mol %, from about 0.5 mol % to about 2 mol %, from about 0.5 mol % to about 1.5 mol %, or from about 0.5 mol % to about 1 mol %, and all ranges and sub-ranges therebetween. In one or more embodiments, the glass composition may be substantially free of $K_2O$.

In one or more embodiments, the glass composition is substantially free of $Li_2O$.

In one or more embodiments, the amount of $Na_2O$ in the composition may be greater than the amount of $Li_2O$. In some instances, the amount of $Na_2O$ may be greater than the combined amount of $Li_2O$ and $K_2O$. In one or more alternative embodiments, the amount of $Li_2O$ in the composition may be greater than the amount of $Na_2O$ or the combined amount of $Na_2O$ and $K_2O$.

In one or more embodiments, the glass composition may include a total amount of RO (which is the total amount of alkaline earth metal oxide such as CaO, MgO, BaO, ZnO and SrO) in a range from about 0 mol % to about 2 mol %. In some embodiments, the glass composition includes a non-zero amount of RO up to about 2 mol %. In one or more embodiments, the glass composition comprises RO in an amount from about 0 mol % to about 1.8 mol %, from about 0 mol % to about 1.6 mol %, from about 0 mol % to about 1.5 mol %, from about 0 mol % to about 1.4 mol %, from about 0 mol % to about 1.2 mol %, from about 0 mol % to about 1 mol %, from about 0 mol % to about 0.8 mol %, from about 0 mol % to about 0.5 mol %, and all ranges and sub-ranges therebetween.

In one or more embodiments, the glass composition includes CaO in an amount less than about 1 mol %, less than about 0.8 mol %, or less than about 0.5 mol %. In one or more embodiments, the glass composition is substantially free of CaO.

In some embodiments, the glass composition comprises MgO in an amount from about 0 mol % to about 7 mol %, from about 0 mol % to about 6 mol %, from about 0 mol % to about 5 mol %, from about 0 mol % to about 4 mol %, from about 0.1 mol % to about 7 mol %, from about 0.1 mol % to about 6 mol %, from about 0.1 mol % to about 5 mol %, from about 0.1 mol % to about 4 mol %, from about 1 mol % to about 7 mol %, from about 2 mol % to about 6 mol %, or from about 3 mol % to about 6 mol %, and all ranges and sub-ranges therebetween.

In one or more embodiments, the glass composition comprises $ZrO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $ZrO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition comprises $SnO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises SnO2 in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition may include an oxide that imparts a color or tint to the glass articles. In some embodiments, the glass composition includes an oxide that prevents discoloration of the glass article when the glass article is exposed to ultraviolet radiation. Examples of such oxides include, without limitation oxides of: Ti, V, Cr, Mn, Fe, Co, Ni, Cu, Ce, W, and Mo.

In one or more embodiments, the glass composition includes Fe expressed as $Fe_2O_3$, wherein Fe is present in an amount up to (and including) about 1 mol %. In some embodiments, the glass composition is substantially free of Fe. In one or more embodiments, the glass composition comprises $Fe_2O_3$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $Fe_2O_3$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

Where the glass composition includes $TiO_2$, $TiO_2$ may be present in an amount of about 5 mol % or less, about 2.5 mol % or less, about 2 mol % or less or about 1 mol % or less. In one or more embodiments, the glass composition may be substantially free of $TiO_2$.

An exemplary glass composition includes $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1. 5 mol % to about 6 mol %. Optionally, $SnO_2$ may be included in the amounts otherwise disclosed herein. It should be understood, that while the preceding glass composition paragraphs express approximate ranges, in other embodiments, glass substrate 134 may be made from any glass composition falling with any one of the exact numerical ranges discussed above.

EXAMPLES

Applicant has demonstrated the effectiveness of various adhesive materials at limiting shattering/crack formation in a variety of sharp local impact tests, the results of which are illustrated in FIGS. 6-9. In these tests, the impactor is a sharp punch with a mass of 69.160 g. The impactor was dropped from a height of 5" on each of the glass samples discussed below. The samples were prepared by laminating glass on to a 0.125" thick Aluminum 3000 plate. The various adhesives were applied following manufacturer recommended application processes. The thicknesses of the adhesive layers for each test were around 125 microns, except for the VHB adhesive which was about 1.1 mm. To prepare curved glass samples, the aluminum plate was rolled to desired radius and then the glass was cold bent on to the rolled aluminum plate and bonded using each of the test adhesives. Clamps were utilized to hold the cold bent glass in shape until the desired curing time of the adhesives was achieved. The glass used in all tests was 0.7 mm thick Gorilla® Glass available from Corning Inc.

FIG. 6 shows the effect of six different adhesives (modulus from 1.55 GPa to 0.45 MPa) on the frangibility of a flat sheet of glass. As shown in FIG. 6, no crack branching and growth was observed in higher modulus adhesives. With very low modulus adhesives, a clear star pattern in cracks is observed after the sharp local impact. This example demonstrates the effect of high modulus adhesive on frangibility.

FIG. 7 shows the effect of two adhesives (high and low modulus of 1.55 GPa and 0.45 Mpa, respectively) on the frangibility of glass in the 3D concave shape. The radius of curvature of the glass sheet was 100 mm. In both of these cases, the glass sample fractured into many small pieces. However, with the high modulus adhesive, most of the glass shards were retained as compared to low modulus case.

FIG. 8 is similar to FIG. 7, except the radius of curvature was increased to 250 mm. In this case, the high modulus adhesive glass sample showed much better frangibility as compared to the low modulus case.

FIG. 9 shows the effect of four different adhesives (modulus from 1.55 GPa to 0.45 MPa) on the frangibility of glass in the 3D convex shape. The radius of curvature of the glass sheet was 250 mm. As shown, crack branching and growth was severely reduced in high modulus adhesives compared to low modulus adhesives.

Figure 10:
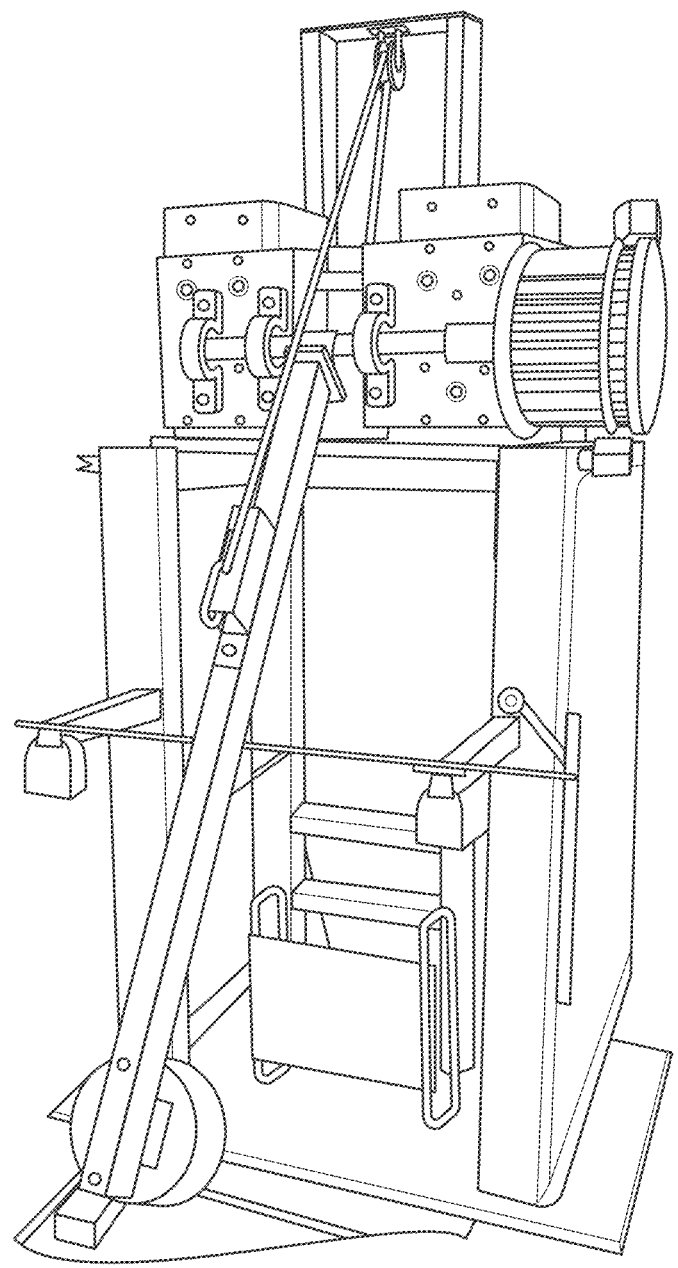
FIG. 10 shows the setup for the Headform Impact Test utilized in testing various glass articles discussed herein.

FIG. 10 shows the setup for Headform Impact Test (HIT) that was utilized for the HIT testing. HIT is one of the most important criteria for determining occupant safety in a motor vehicle collision. Automotive companies are always looking for ways to improve occupant safety via new designs and/or utilizing energy absorbing materials. The FMVSS201 and ECE R21 regulations describe the requirements for automotive interiors components during a crash event. These regulations are similar for the most part, with some differences in how impact zones and angles are defined. Per these regulations: "A point within the head impact area is impacted by a 15 pound, 6.5 inch diameter head form at a velocity of 15 miles per hour. The deceleration of the head form shall not exceed 80 g continuously for more than 3 milliseconds (ms)." In addition to these requirements, there is a desire from automotive companies that cover glasses not break during the impact event. However, in case of breaking, it is generally desirable that no large pieces be formed that may injure the vehicle occupant. Table 1 below shows the test data from the HIT test.

TABLE 1

| Adhesive (modulus) | Abrasion on Interior Surface | Amount of Shards (g) (Weight before − Weight after = amount of shards) Initial glass weight = 24.258 g | Glass Condition after HIT | Deceleration (g) |
|---|---|---|---|---|
| 3M VHB (0.45 MPa) | No abrasion | 213.843 − 213.843 = 0 (glass did not break) | No break | 62.6 |
| 3M VHB (0.45 MPa) | 90 Grit SiC - 10 psi - 5 s | 215.775 − 215.102 = 0.673 g | Break | 64.2 |
| 3M 8215 OCA (1.34 MPa) | 90 Grit SiC - 10 psi - 5 s | 204.776 − 204.257 = 0.519 g | Break | 60.9 |
| Masterbond EP21TDCHT-LO Epoxy (1.55 GPa) | 90 Grit SiC - 10 psi - 5 s | 213.349 − 213.349 = 0 (glass did not break) | No Break | 61.0 |

Table 1 shows the data of several samples (as-received and different abrasion conditions) and adhesives from the HIT testing. Abrasion on the interior surface of the glass article was utilized to mimic defects in manufacturing or handling glass parts. The abrasion was created using 90 grit SiC at 10 psi for 5 seconds. The Cs/DOL of Gorilla® Glass was at 830 MPa/40 μm. The as received Gorilla® glass samples passed headform impact test with no breakage. This is due to high compressive stress of 830 MPa on the surface of glass. For the glass samples with abrasion on the interior surface, only high modulus adhesives passed the HIT test. Without wishing to be bound with theory, it is believed that the high modulus adhesive on the interior surface with abrasion greatly limits the propagation of crack during the headform impact test. This test shows that the use of high modulus adhesive allows higher level of manufacturing/handling related defects.

HIT testing can present challenges when performed on an edge of a surface, as edges may include defects or otherwise be susceptible to mechanical effects that could cause the impacted glass surface to fail HIT testing. For example, an impact on or near the edge of a glass surface can result buckling in the glass surface, which causes a failure some distance away from the edge. This type of edge failure can result in a HIT failure. However, the use of a high modulus adhesive on the interior surface of a glass article as described herein can improve HIT performance for impacts on or near the edge of the glass article. In general, without wishing to be bound by theory, it is believed that the high modulus adhesive reduces or prevents buckling at the edge, thus preventing the failure in the glass surface. This improved edge performance can be achieved for curved or flat glass sheets using a high modulus adhesive.

Aspect (1) pertains to a vehicle interior system comprising: a frame comprising a curved support surface; a glass substrate coupled to the curved support surface of the frame, the glass substrate comprising: a first major surface; a second major surface; a minor surface connecting the first major surface and the second major surface; and a thickness in a range from 0.05 mm to 2 mm; wherein the first major surface of the glass substrate includes a curved section and the second major surface of the curved glass substrate includes a curved section; wherein the curved section of the first major surface includes a first radius of curvature greater than 30 mm and less than 1.5 m; and a layer of a high modulus adhesive located on the second major surface, wherein the high modulus adhesive has a modulus of elasticity of at least 500 MPa, wherein an outer region of the high modulus adhesive layer bonds the glass substrate to the curved support surface of the frame.

Aspect (2) pertains to the vehicle interior system of Aspect (1), wherein the high modulus adhesive is a polymer adhesive material, wherein the high modulus adhesive has a modulus of elasticity that is less than 5 GPa.

Aspect (3) pertains to the vehicle interior system of Aspect (1) or Aspect (2), wherein the high modulus adhesive has a modulus of elasticity that is 750 MPa to 3 GPa.

Aspect (4) pertains to the vehicle interior system of any one of Aspects (1) through (3), wherein the high modulus adhesive layer has a thickness that is less 1 mm.

Aspect (5) pertains to the vehicle interior system of any one of Aspects (1) through (4), wherein the high modulus adhesive layer has a thickness that is 25 μm to 500 μm.

Aspect (6) pertains to the vehicle interior system of any one of Aspects (1) through (5), wherein the curved support surface is a convex curved surface, the curved section of the first major surface is a convex curved section and the curved section of the second major surface is a concave curved section.

Aspect (7) pertains to the vehicle interior system of any one of Aspects (1) through (6), wherein the glass substrate is at least one of chemically strengthened and thermally strengthened, and the glass substrate is cold formed to the first radius of curvature.

Aspect (8) pertains to the vehicle interior system of any one of Aspects (1) through (7), wherein the first major surface of the glass substrate is under a compressive stress, $CS_1$, and the second major surface is under a compressive stress, $CS_2$, wherein $CS_1$ is different than $CS_2$.

Aspect (9) pertains to the vehicle interior system of any one of Aspects (1) through (8), wherein the glass substrate includes an anti-reflective coating on the first major surface.

Aspect (10) pertains to the vehicle interior system of any one of Aspects (1) through (9), wherein the high modulus adhesive layer includes a toughening agent.

Aspect (11) pertains to the vehicle interior system of any one of Aspects (1) through (10), wherein the high modulus adhesive forms a contiguous adhesive layer completely covering the second major surface.

Aspect (12) pertains to the vehicle interior system of any one of Aspects (1) through (11), wherein the high modulus adhesive forms a pattern on the second major surface such that the second major surface is not completely covered with the high modulus adhesive.

Aspect (13) pertains to the vehicle interior system of any one of Aspects (1) through (12), wherein a maximum thickness of the glass substrate measured between the first and second major surfaces is less than or equal to 1.5 mm.

Aspect (14) pertains to the vehicle interior system of any one of Aspects (1) through (13), wherein a maximum thickness of the glass substrate measured between the first and second major surfaces is 0.3 mm to 0.7 mm.

Aspect (15) pertains to the vehicle interior system of any one of Aspects (1) through (14), wherein the first major surface of the glass substrate has a width and a length, wherein the width is 5 cm to 250 cm, and the length is 5 cm to 250 cm.

Aspect (16) pertains to the vehicle interior system of any one of Aspects (1) through (15), wherein the frame comprises any one of a center console, a dashboard, an arm rest, a pillar, a seat back, a floor board, a headrest, a door panel, and a steering wheel.

Aspect (17) pertains to the vehicle interior system of any one of Aspects (1) through (16), wherein the vehicle is any one of an automobile, a sea craft, and an aircraft.

Aspect (18) pertains to a shatter resistant, cold-formed glass article comprising: a first major surface; a second major surface; a thickness measured between the first major surface and the second major surface of 0.05 mm to 2 mm; a layer of high modulus adhesive located on the second major surface, wherein the high modulus adhesive has a modulus of elasticity of at least 500 MPa; and a surface treatment located on the first major surface; wherein the first major surface includes a curved section and the second major surface includes a curved section; and wherein the curved section of the first major surface includes a first radius of curvature greater than 30 mm and less than 1.5 m.

Aspect (19) pertains to the glass article of Aspect (18), wherein the surface treatment is an anti-reflective coating.

Aspect (20) pertains to the glass article of Aspect (18) or Aspect (19), wherein the high modulus adhesive is a polymer adhesive material, wherein the high modulus adhesive has a modulus of elasticity that is less than 5 GPa.

Aspect (21) pertains to the glass article of any one of Aspects (18) through (20), wherein the high modulus adhesive has a modulus of elasticity that is 750 MPa to 3 GPa.

Aspect (22) pertains to the glass article of any one of Aspects (18) through (21), wherein the high modulus adhesive layer has a thickness that is less 1 mm.

Aspect (23) pertains to the glass article of any one of Aspects (18) through (22), wherein the high modulus adhesive layer has a thickness that is 25 μm to 500 μm.

Aspect (24) pertains to the glass article of any one of Aspects (18) through (23), wherein the curved section of the first major surface is a convex curved section and the curved section of the second major surface is a concave curved section.

Aspect (25) pertains to the glass article of any one of Aspects (18) through (24), further comprising at least one of chemically strengthened glass material and thermally strengthened glass material.

Aspect (26) pertains to the glass article of any one of Aspects (18) through (25), wherein the first major surface is under a compressive stress, $CS_1$, and the second major surface is under a compressive stress, $CS_2$, wherein $CS_1$ is different than $CS_2$.

Aspect (27) pertains to the glass article of any one of Aspects (18) through (26), wherein the high modulus adhesive layer includes a toughening agent.

Aspect (28) pertains to the glass article of any one of Aspects (18) through (27), wherein the high modulus adhesive forms a contiguous adhesive layer completely covering the second major surface.

Aspect (29) pertains to the glass article of any one of Aspects (18) through (28), wherein the thickness measured between the first and second major surfaces is less than or equal to 1.5 mm.

Aspect (30) pertains to the glass article of any one of Aspects (18) through (29), wherein the first major surface has a width and a length, wherein the width is 5 cm to 250 cm, and the length is 5 cm to 250 cm.

Aspect (31) pertains to a method of forming a vehicle interior system comprising: applying a high modulus adhesive to a glass substrate, wherein the glass substrate has a first major surface and a second major surface opposite the first major surface, wherein the second major surface of the glass substrate faces a curved support surface of a frame and the high modulus adhesive is applied to the second major surface, wherein the high modulus adhesive has a modulus of elasticity of at least 500 MPa; and applying a force to the glass substrate causing the glass substrate to bend into conformity with a curved shape of the curved support surface of the frame such that a curved glass substrate is formed, wherein the first major surface of the curved glass substrate includes a curved section and the second major surface of the curved glass substrate includes a curved section, wherein during application of the force, a maximum temperature of the glass substrate is less than a glass transition temperature of the glass substrate; and curing the high modulus adhesive while applying the force such that the glass substrate is bonded to the frame and is maintained in the curved shape.

Aspect (32) pertains to the method of Aspect (31), wherein the high modulus adhesive is a polymer adhesive material, wherein the high modulus adhesive has a modulus of elasticity that is less than 5 GPa.

Aspect (33) pertains to the method of Aspect (31) or Aspect (32), wherein the high modulus adhesive has a modulus of elasticity that is 750 MPa to 3 GPa.

Aspect (34) pertains to the method of any one of Aspects (31) through (33), wherein the high modulus adhesive forms a layer that has a thickness that is less 1 mm.

Aspect (35) pertains to the method of any one of Aspects (31) through (34), wherein the high modulus adhesive forms a layer that has a thickness that is 25 µm to 500 µm.

Aspect (36) pertains to the method of any one of Aspects (31) through (35), wherein the curved support surface is a convex curved surface, the curved section of the first major surface is a convex curved section and the curved section of the second major surface is a concave curved section.

Aspect (37) pertains to the method of any one of Aspects (31) through (36), wherein the glass substrate is at least one of chemically strengthened and thermally strengthened.

Aspect (38) pertains to the method of any one of Aspects (31) through (37), wherein the first major surface of the glass substrate is under a compressive stress, $CS_1$, and the second major surface is under a compressive stress, $CS_2$, wherein $CS_1$ is different than $CS_2$.

Aspect (39) pertains to the method of any one of Aspects (31) through (38), wherein the glass substrate includes an anti-reflective coating on the first major surface.

Aspect (40) pertains to the method of any one of Aspects (31) through (39), wherein the high modulus adhesive includes a toughening agent.

Aspect (41) pertains to the method of any one of Aspects (31) through (40), wherein the high modulus adhesive forms a contiguous adhesive layer completely covering the second major surface.

Aspect (42) pertains to the method of any one of Aspects (31) through (41), wherein a maximum thickness of the glass substrate measured between the first and second major surfaces is less than or equal to 1.5 mm.

Aspect (43) pertains to the method of any one of Aspects (31) through (42), wherein a maximum thickness of the glass substrate measured between the first and second major surfaces is 0.3 mm to 0.7 mm.

Aspect (44) pertains to the method of any one of Aspects (31) through (43), wherein the first major surface of the glass substrate has a width and a length, wherein the width is 5 cm to 250 cm, and the length is 5 cm to 250 cm.

Aspect (45) pertains to the method of any one of Aspects (31) through (44), wherein the frame comprises any one of a center console, a dashboard, an arm rest, a pillar, a seat back, a floor board, a headrest, a door panel, and a steering wheel.

Aspect (46) pertains to the method of any one of Aspects (31) through (45), wherein the vehicle is any one of an automobile, a sea craft, and an aircraft.

Aspect (47) pertains to a vehicle interior system comprising: a frame comprising a support surface; a glass substrate coupled to the support surface of the frame, the glass substrate comprising: a first major surface; a second major surface opposite the first major surface; a minor surface connecting the first major surface and the second major surface; and a thickness in a range from 0.05 mm to 2 mm; a layer of a high modulus adhesive located on the second major surface, wherein the high modulus adhesive has a modulus of elasticity of at least 500 MPa, wherein an outer region of the high modulus adhesive layer bods the glass substrate to the support surface of the frame, wherein, when an impacter having a mass of 6.8 kg impacts an edge of the glass substrate at an impact velocity of 5.35 m/s to 6.69 m/s, the deceleration of the impacter is 120 g (g-force) or less.

Aspect (48) pertains to the vehicle interior system of Aspect (47), wherein the impacter is moving relative to the glass substrate at an angle of less than 90° with respect to the first major surface or the minor surface when impact with the edge occurs.

Aspect (49) pertains to the vehicle interior system of Aspect (47) or Aspect (48), wherein the first major surface of the glass substrate includes a curved section and the second major surface of the curved glass substrate includes a curved section, wherein the curved section of the first major surface includes a first radius of curvature greater than 30 mm and less than 1.5 m, and wherein the impacter impacts the edge of the glass substrate in the curved section of the first major surface.

Aspect (50) pertains to the vehicle interior system of Aspect (47) or Aspect (48), wherein the first major surface includes a flat section, and wherein the impacter impacts the edge of the glass substrate in the flat section of the first major surface.

Aspect (51) pertains to the vehicle interior system of any one of Aspects (47) through (50), wherein the high modulus adhesive is a polymer adhesive material, wherein the high modulus adhesive has a modulus of elasticity that is less than 5 GPa.

Aspect (52) pertains to the vehicle interior system of any one of Aspects (47) through (51), wherein the high modulus adhesive has a modulus of elasticity that is 750 MPa to 3 GPa.

Aspect (53) pertains to the vehicle interior system of any one of Aspects (47) through (52), wherein the high modulus adhesive layer has a thickness that is less 1 mm.

Aspect (54) pertains to the vehicle interior system of any one of Aspects (47) through (53), wherein the high modulus adhesive layer has a thickness that is 25 µm to 500 µm.

Aspect (55) pertains to the vehicle interior system of any one of Aspects (47) through (54), wherein the glass substrate is at least one of chemically strengthened and thermally strengthened, and the glass substrate is cold formed to the support surface.

Aspect (56) pertains to the vehicle interior system of any one of Aspects (47) through (55), wherein a maximum thickness of the glass substrate measured between the first and second major surfaces is less than or equal to 1.5 mm.

Aspect (57) pertains to the vehicle interior system of any one of Aspects (47) through (56), the vehicle interior system further comprising a coating on the first major surface of the glass substrate, the coating comprising at least one of an anti-reflective coating, an easy-to-clean coating, and a decorative ink coating.

Aspect (58) pertains to the vehicle interior system of Aspect (57), wherein the coating has a pencil hardness of at least 9H under ASTM D3363.

Aspect (59) pertains to the vehicle interior system of Aspects (57) or Aspect (58), wherein the coating comprises the anti-reflective coating or the easy-to-clean coating, and the coating has an abrasion resistance such that the coating exhibits a contact angle of at least 100 degrees under ASTM D7490 and no optical or delamination defects under ISO 9211-4 after subjected to at least 2000 cycles of a rubber eraser under a load of 10 N.

Aspect (60) pertains to the vehicle interior system of any one of Aspects (57) through (59), wherein the coating comprises the anti-reflective coating or the easy-to-clean coating, and the coating has an abrasion resistance such that the coating exhibits a contact angle of at least 100 degrees under ASTM D7490 and no optical or delamination defects under ISO 9211-4 after subjected to at least 400,000 cycles of cheesecloth or gauze under a load of 7.5 N.

Aspect (61) pertains to the vehicle interior system of any one of Aspects (57) through (60), wherein the coating comprises the decorative ink coating, and the coating has an abrasion resistance such that the coating exhibits no peeling or visual defects under ISO 9211-4 after subjected to at least 100 cycles of cheesecloth or gauze under a load of 5 N, or after subjected to at least 100 cycles of wet cheesecloth under a load of 5 N, where the wet cheesecloth is applied with an abrasive (e.g., benzine, a powdered abrasives (such as the combination of sodium dodecylbenzenesulfonate, sodium carbonate, and quartz, for example, the powdered cleanser available under the trade name Ajax from the Colgate-Palmolive Company), or an alcohol-containing liquid).

Aspect (62) pertains to the vehicle interior system of any one of Aspects (57) through (61), wherein the coating comprises the anti-reflective coating or the easy-to-clean coating, and the coating maintains a contact angle of at least 100 degrees under ASTM D74900, and exhibits no visual defects of delamination or color after being abraded with 0000 grade steel wool under a 1 kg load at 60 cycles per minute with a 40 mm stroke for at least 3000 cycles, or at least 5000 cycles.

Aspect (63) pertains to the vehicle interior system of any one of Aspects (57) through (62), wherein the coating comprises the anti-reflective coating or the easy-to-clean coating, and the coating maintains a contact angle of at least 100 degrees under ASTM D74900, and exhibits no visual defects of delamination or color after being abraded with denim cloth under a 1 kg load at 60 cycles per minute for at least 10,000 cycles.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A shatter resistant, cold-formed glass article comprising:
    a glass substrate comprising a first major surface; a second major surface; and a thickness measured between the first major surface and the second major surface of 0.05 mm to 2 mm;
    a layer of high modulus adhesive located on the second major surface, wherein the high modulus adhesive has a modulus of elasticity of at least 500 MPa;
    a surface treatment located on the first major surface; and
    a frame comprising a curved surface, wherein the glass substrate is cold-formed against the curved surface and the layer of high modulus adhesive is bonded to the curved surface,
    wherein the first major surface includes a curved section and the second major surface includes a curved section;
    wherein the curved section of the first major surface includes a first radius of curvature greater than 30 mm and less than 1.5 m; and
    wherein the first major surface is under a compressive stress, $CS_1$, and the second major surface is under a compressive stress, $CS_2$, wherein $CS_1$ is different than $CS_2$ as a result of the glass substrate being cold-formed via the layer of high modulus adhesive.

2. The glass article of claim 1, wherein the surface treatment is an anti-reflective coating.

3. The glass article of claim 1, wherein the high modulus adhesive is a polymer adhesive material, wherein the high modulus adhesive has a modulus of elasticity that is less than 5 GPa.

4. The glass article of claim 1, wherein the curved section of the first major surface is a convex curved section and the curved section of the second major surface is a concave curved section.

5. The glass article of claim 1, further comprising at least one of chemically strengthened glass material and thermally strengthened glass material.

6. The glass article of claim 1, wherein the first major surface has a width and a length, wherein the width is 5 cm to 250 cm, and the length is 5 cm to 250 cm.

7. The glass article of claim 1, wherein the modulus of elasticity is at most 3 GPa.

8. The glass article of claim 1, wherein the layer of high modulus adhesive comprises a thickness that is greater than or equal to 25 μm and less than or equal to 500 μm.

9. The glass article of claim 1, wherein the layer of high modulus adhesive is applied in a dot pattern and portions of the second major surface are not covered by the layer of high modulus adhesive.

* * * * *

UNITED STATES PATENT AND TRADEMARK OFFICE
CERTIFICATE OF CORRECTION

PATENT NO. : 11,718,071 B2
APPLICATION NO. : 16/979918
DATED : August 8, 2023
INVENTOR(S) : Atul Kumar et al.

It is certified that error appears in the above-identified patent and that said Letters Patent is hereby corrected as shown below:

On the Title Page

On the Page 6, in Column 1, under "Other Publications", Line 15, delete "Internaitonal" and insert -- International --.

On the page 6, in Column 1, under "Other Publications", Line 21, delete "Faade" and insert -- Facade --.

On the page 6, in Column 1, under "Other Publications", Line 22, delete "Faade"" and insert -- Facade" --.

On the Page 6, in Column 1, under "Other Publications", Line 50, delete "atglasstec," and insert -- at glasstec, --.

On the Page 6, in Column 2, under "Other Publications", Line 22, delete ""Pegaton" and insert -- "Pegatron --.

On the Page 6, in Column 2, under "Other Publications", Line 23, delete "Cnsole" and insert -- Console --.

Signed and Sealed this
Ninth Day of January, 2024

Katherine Kelly Vidal
*Director of the United States Patent and Trademark Office*